(12) United States Patent
Cheung et al.

(10) Patent No.: US 12,593,762 B2
(45) Date of Patent: Apr. 7, 2026

(54) PLANT FIBER BIOCOMPOSITES

(71) Applicant: NUtech Ventures, Lincoln, NE (US)

(72) Inventors: Chin Li Cheung, Lincoln, NE (US);
Mark Alan Helle, Lincoln, NE (US);
Avinash K. Both, Lincoln, NE (US)

(73) Assignee: NUtech Ventures, Lincoln, NE (US)

( * ) Notice: Subject to any disclaimer, the term of this patent is extended or adjusted under 35 U.S.C. 154(b) by 350 days.

(21) Appl. No.: 17/887,172

(22) Filed: Aug. 12, 2022

(65) Prior Publication Data

US 2023/0058483 A1 Feb. 23, 2023

Related U.S. Application Data

(60) Provisional application No. 63/232,596, filed on Aug. 12, 2021.

(51) Int. Cl.
| | |
|---|---|
| *A01G 24/27* | (2018.01) |
| *A01G 24/35* | (2018.01) |
| *C08L 29/04* | (2006.01) |

(52) U.S. Cl.
CPC ............. *A01G 24/27* (2018.02); *A01G 24/35* (2018.02); *C08L 29/04* (2013.01)

(58) Field of Classification Search
CPC .......... A01G 24/27; A01G 24/35; C08L 29/04
See application file for complete search history.

(56) References Cited

U.S. PATENT DOCUMENTS

| | | | |
|---|---|---|---|
| 10,533,031 B2 | 1/2020 | Helle et al. | |
| 10,899,667 B2 | 1/2021 | Smith et al. | |
| 2019/0134962 A1* | 5/2019 | Poppe ................... | B32B 29/002 |

OTHER PUBLICATIONS

Anugwom et al., "Lignin as a functional additive in a biocomposite: Influence on mechanical properties of polylactic acid composites," Industrial Crops and Products, Nov. 2019, 140:111704, 13 pages.

Cherney et al., "Industrial Hemp in North America: Production, Politics and Potential," Agronomy, Nov. 2016, 6(4):58, 24 pages.
Crini et al., "Applications of hemp in textiles, paper industry, insulation and building materials, horticulture, animal nutrition, food and beverages, nutraceuticals, cosmetics and hygiene, medicine, agrochemistry, energy production and environment: a review," Environ. Chem. Lett., Jun. 2020, 18:1451-1476, 27 pages.
Di Landro et al., "Composites with hemp reinforcement and bio-based epoxy matrix," Composites Part B: Engineering, Dec. 2014, 67:220-226.
Dick et al., "Chemical modification and plasma-induced grafting of pyrolitic lignin. Evaluation of the reinforcing effect on lignin/poly(1-lactide) composites," Polymer, Jun. 2017, 118:280-296.
Etaati et al., "Ground Hemp Fibers as Filler/Reinforcement for Thermoplastic Biocomposites," Advances in Materials Science and Engineering, 2015, 2015:513590, 12 pages.
Gessert et al., "Measuring a Medium's Airspace and Water Holding Capacity," Ornamentals Northwest, Jun. 1976, 1(8):11-12, 3 pages.
Lomonaco et al., "Release of harmful volatile organic compounds (VOCs) from photo-degraded plastic debris: A neglected source of environmental pollution," J Hazard Mater., Jul. 2020, 394:122596.
Manaia et al., "Industrial Hemp Fibers: An Overview," Fibers, Dec. 2019, 7(12):106, 16 pages.
Rumchev et al., "Volatile Organic Compounds: Do they present a risk to our health?," Rev. Environ. Health, Jan. 2007, 22(1):67-82.
Schluttenhofer et al., "Challenges towards Revitalizing Hemp: A Multifaceted Crop," Trends Plant Sci., Nov. 2017, 22(11):917-929.
Wang et al., "Study of Structural Morphology of Hemp Fiber from the Micro to the Nanoscale," Appl. Compos. Mater., Jan. 2007, 14:89-103, 15 pages.
Xiong et al., "Economically Competitive Biodegradable PBAT/Lignin Composites: Effect of Lignin Methylation and Compatibilizer," ACS Sustainable Chem. Eng., Mar. 2020, 8(13):5338-5346, 9 pages.
Zwawi, "A Review on Natural Fiber Bio-Composites, Surface Modifications and Applications," Molecules, Jan. 2021, 26(2):404, 28 pages.

* cited by examiner

*Primary Examiner* — Angela C Scott
(74) *Attorney, Agent, or Firm* — Fish & Richardson P.C.

(57) ABSTRACT

This document provides hemp fiber biocomposites and methods and materials for making and using hemp fiber biocomposites. For example, hemp fiber biocomposites that can be used as a hydroponic growth medium are provided. Methods for making hemp fiber biocomposites also are provided.

5 Claims, 32 Drawing Sheets

Scheme 1

1.

NaNO₂

H₂O/H⁺

2.

Lignin on
hemp fibers

Reactive hemp fibers

FIG. 2

Scheme 2

Scheme 3

Reactive hemp fibers

Deactivated reactive hemp fibers

FIG. 4

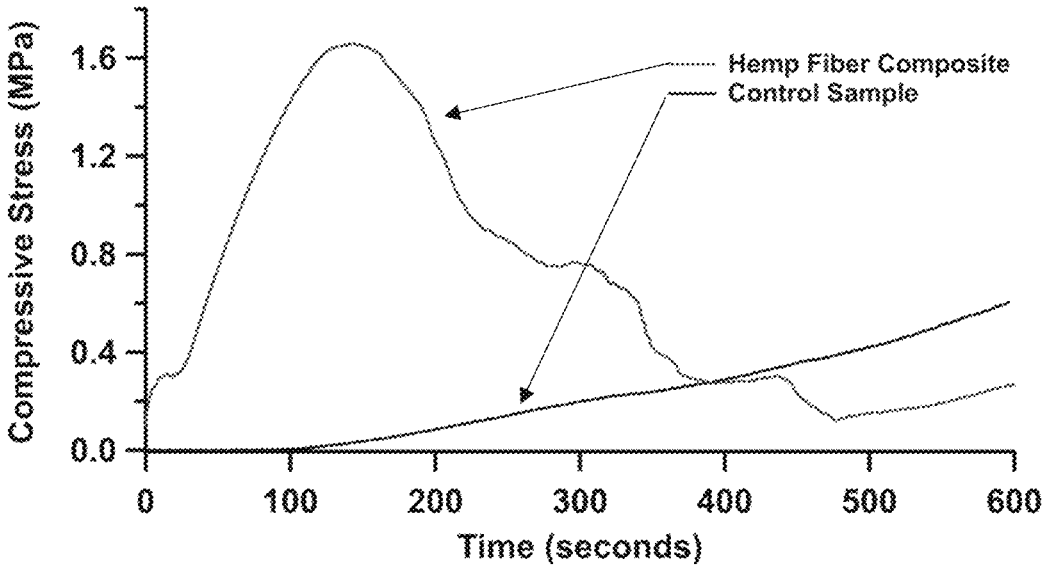
FIG. 8A
FIG. 8B
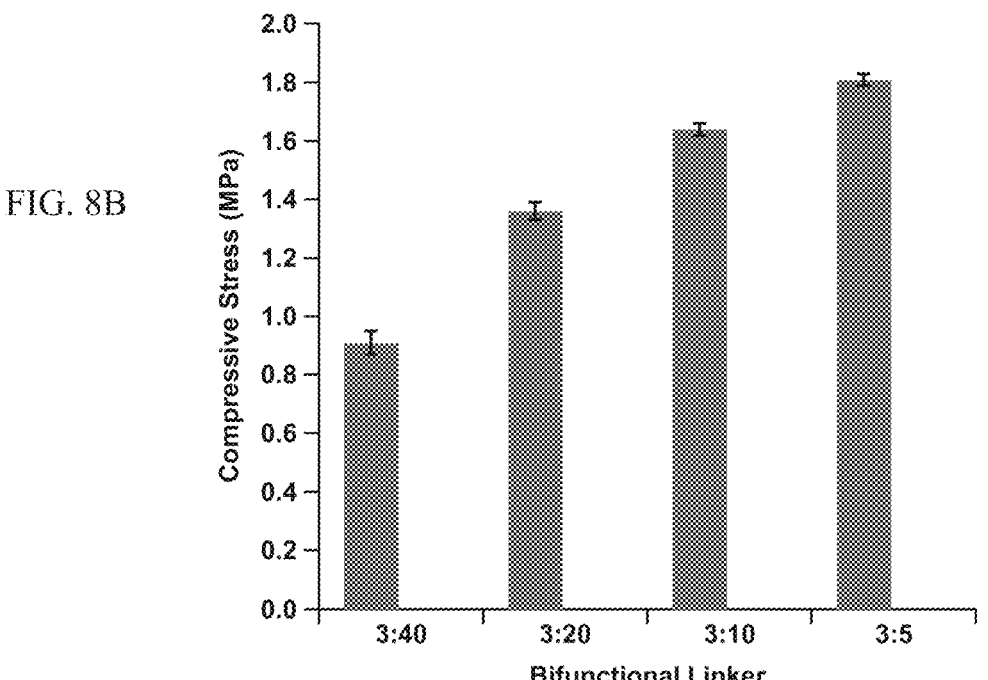

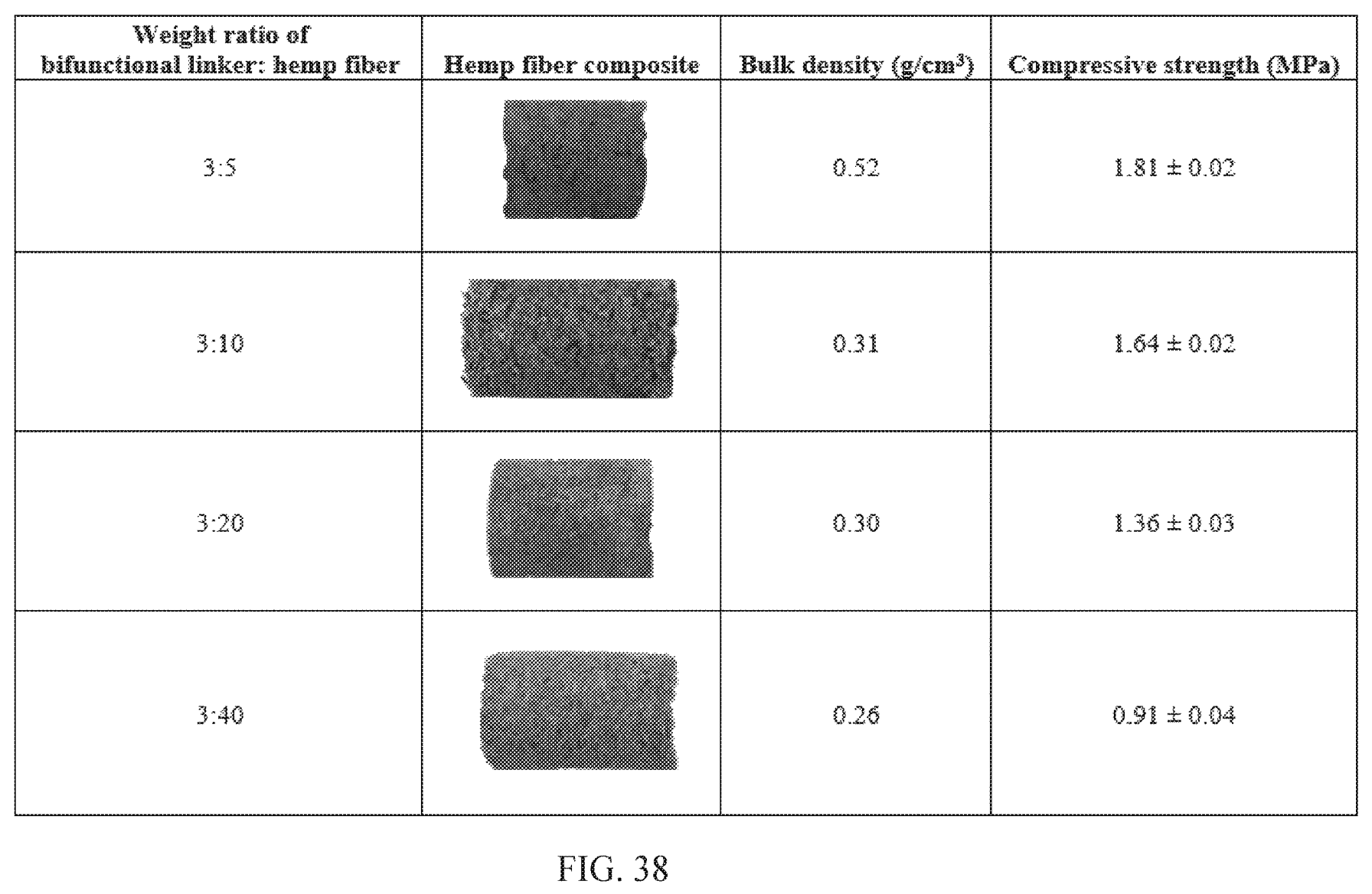

| Weight ratio of bifunctional linker: hemp fiber | Hemp fiber composite | Bulk density (g/cm³) | Compressive strength (MPa) |
|---|---|---|---|
| 3:5 | | 0.52 | 1.81 ± 0.02 |
| 3:10 | | 0.31 | 1.64 ± 0.02 |
| 3:20 | | 0.30 | 1.36 ± 0.03 |
| 3:40 | | 0.26 | 0.91 ± 0.04 |

FIG. 38

PLANT FIBER BIOCOMPOSITES

CROSS-REFERENCE TO RELATED APPLICATIONS

This application claims the benefit of U.S. Patent Application Ser. No. 63/232,596, filed on Aug. 12, 2021. The disclosure of the prior application is considered part of (and is incorporated by reference in) the disclosure of this application.

TECHNICAL FIELD

This document relates to methods and materials for making and using plant fiber (e.g., hemp fiber) biocomposites. For example, hemp fiber biocomposites that can be used as a hydroponic growth medium are provided. Methods for making hemp fiber biocomposites also are provided.

BACKGROUND INFORMATION

Hemp fibers are composed of mainly cellulose, hemicellulose, and lignin. Though the mass percent of lignin in plants is only 10-15%, it acts as the essential glue that gives plants their structural integrity (Wang et al., *Appl. Compos. Mater.*, 2007, 14:89). According to FAO (Food and Agriculture Organization of the United Nations), the global production of hemp fiber was about $214 \times 10^3$ tons annually in 2020 (Schluttenhofer et al., *Trends Plant Sci.*, 2017, 22:917-929; and Crini et al., *Environ. Chem. Lett.*, 2020, 18:1451-1476). The recent drastic increase in hemp farming, especially in the U.S. due to changes in regulations to grow hemp for CBD harvesting, has led to a huge increase in the supply of hemp fibers as an industrial byproduct (Cherney et al., *Agronomy*, 2016, 6:58).

Hemp fibers have been increasingly used and explored for producing eco-friendly biocomposites for structure reinforcement applications (Manaia et al., *Fibers*, 2019, 7:106). Typically, they are produced by polymerization of monomers uniformly mixed with the hemp fibers. The fabrications of composites with thermoplastics and thermosetting plastics usually require organic solvents and produce volatile organic byproducts which are harmful to the environment (Rumchev et al., *Rev. Environ. Health*, 2007, 22:39-56). Unless the plastics within the composites are completely cured under sufficient heating, harmful volatile organic compounds (VOCs) (such as formaldehyde) may continue to release from the composite (Lomonaco et al., *J. Hazard. Mater.*, 2020, 394:122596).

SUMMARY

Natural fibers typically exhibit poor water resistance, low durability, and poor fiber/polymer matrix interfacial bonding, and these factors may lead to decreasing the total mechanical strength of the natural fiber composites (Zwawi, *Molecules*, 2021, 26:404).

This document provides methods and materials for making and using plant fiber (e.g., hemp fiber) biocomposites. In some cases, this document provides plant fiber (e.g., hemp fiber) biocomposites containing a network of one or more lignin-containing plant fibers crosslinked by one or more polymers (e.g., polyvinyl alcohol (PVA)). This document also provides methods (e.g., water-based reactions) for making and using plant fiber (e.g., hemp fiber) biocomposites containing one or more lignin-containing plant fibers crosslinked by one or more polymers (e.g., PVA). For example, plant fiber (e.g., hemp fiber) biocomposites provided herein (e.g., hemp fiber biocomposites containing one or more lignin-containing plant fibers crosslinked by one or more polymers such as PVA or pectin) can be made by using a bifunctional linker (e.g., a bifunctional linker containing an aromatic amine and a protected vinyl sulfone) to functionalize lignin-containing plant fibers and cross-linking the functionalized lignin-containing plant fibers with one or more polymers. In some cases, a first functional end of a bifunctional linker can react with a lignin molecule (e.g., a reactive site on a lignin molecule) in a lignin-containing plant fiber to form a reactive lignin-containing plant fiber, and a second end of a bifunctional linker can crosslink the reactive lignin-containing plant fiber with a polymer (e.g., a functional group of polymer such as PVA) to form a plant fiber (e.g., hemp fiber) biocomposite provided herein. For example, plant fiber (e.g., hemp fiber) biocomposites provided herein (e.g., hemp fiber biocomposites containing one or more lignin-containing plant fibers crosslinked by one or more polymers such as PVA or pectin) can be used as a hydroponic growth medium.

As demonstrated herein, synthetic approaches using synthesis of reactive forms of lignin-based plant (e.g., hemp and coco coir) materials with a bifunctional linker can be used to create plant fiber biocomposites one or more lignin-containing plant fibers crosslinked by one or more polymers (e.g., PVA) demonstrate water retention capacity values, porosity, carbon/nitrogen (C/N) ratio, and substrate salinity (electrical conductivity) suitable for hydroponics applications. Also as demonstrated herein, plant fiber biocomposites containing one or more lignin-containing plant fibers crosslinked by one or more polymers (e.g., PVA) can be used as a hydroponic growth medium to grow plants.

Having the ability to use plant fiber (e.g., hemp fiber) biocomposites as a hydroponic growth medium provides a unique and unrealized way to use a biodegradable, renewable material that is available in large supply. Further, the plant fiber (e.g., hemp fiber) biocomposites can be produced using eco-friendly methods (e.g., water-based reactions) that are performed in water without organic solvents and produce only harmless inorganic salts as the major byproducts.

In general, one aspect of this document features hydroponic growth media including a hemp fiber biocomposite having lignin-containing hemp fibers crosslinked by a polymer. The polymer can include PVA. The PVA has a molecular weight of from about 1 kilodaltons (kDa) to about 2000 kDa (e.g., about 80 kDa). The hydroponic growth medium can include from about 0.5 wt % to about 40 wt % polymer. The hydroponic growth medium can include from about 60 wt % to about 98 wt % lignin-containing hemp fibers. The hydroponic growth medium can have a compressive strength of from about 0.5 megapascal (MPa) to about 3 MPa. The hydroponic growth medium can have a water retention capacity of from about 5% to about 20%. The hydroponic growth medium can have a carbon/nitrogen (C/N) ratio of at least 30. The hydroponic growth medium can have an electrical conductivity, when exposed to water, of less than about 2 milliSiemens per centimeter ($mS \cdot cm^{-1}$). The hydroponic growth medium can have, when exposed to a water, a pH of from about 7.2 to about 9.

In another aspect, this document features plant fiber biocomposites including a network of lignin-containing plant fibers crosslinked by a polymer, where the plant fiber biocomposite is formed by a water-based reaction that includes: (a) activating a bifunctional linker including an aromatic amine and a protected vinyl sulfone, where the activating includes converting a nitrogen present in the aromatic amine to an electrophilic diazonium salt; (b) contacting the electrophilic diazonium salt to lignin within a lignin-containing plant fiber to generate a reactive lignin-containing plant fiber anchored to the protected vinyl sulfone; (c) deprotecting the protected vinyl sulfone to obtain a reactive lignin-containing plant fiber anchored to a deprotected vinyl sulfone; and (d) contacting the reactive lignin-containing plant fiber anchored to the deprotected vinyl sulfone with a polymer to crosslink the reactive lignin-containing plant fiber anchored to the deprotected vinyl sulfone to the polymer. The lignin-containing plant fiber can be a hemp fiber, a flax fiber, a jute fiber, a sisal fiber, a kenaf fiber, a coconut husk fiber, or a coco coir fiber. The lignin-containing plant fiber can be a hemp fiber. The bifunctional linker can be 2-[(4-aminophenyl)sulfonyl]ethyl hydrogen sulfate. The activating step can include contacting the bifunctional linker with an aqueous $NaNO_2$ solution. The deprotecting step can include subjecting the reactive lignin-containing plant fiber anchored to the deprotected vinyl sulfone to basic conditions. The basic conditions can include a pH of from about 7.2 to about 9 (e.g., about 8). The deprotecting step can include subjecting the reactive lignin-containing plant fiber anchored to the deprotected vinyl sulfone to a temperature of from about 10° C. to about 40° C. The polymer can include PVA. The PVA can have a molecular weight of from about 1 kDa to about 2000 kDa (e.g., about 80 kDa). The polymer can include pectin. The water-based reaction can be performed without producing formaldehyde, methylene chloride, or methanol. The plant fiber biocomposite can have a plant fiber content of from about 80 wt % to about 99 wt %.

In another aspect, this document features methods (e.g., water-based methods) for making a plant fiber biocomposite including a network of lignin-containing plant fibers cross-linked by a polymer. The methods can include, or consist essentially of: (a) activating a bifunctional linker including an aromatic amine and a protected vinyl sulfone, where the activating includes converting a nitrogen present in the aromatic amine to an electrophilic diazonium salt; (b) contacting the electrophilic diazonium salt to lignin within a lignin-containing plant fiber to generate a reactive lignin-containing plant fiber anchored to the protected vinyl sulfone; (c) deprotecting the protected vinyl sulfone to obtain a reactive lignin-containing plant fiber anchored to a deprotected vinyl sulfone; and (d) contacting the reactive lignin-containing plant fiber anchored to the deprotected vinyl sulfone with a polymer to crosslink the reactive lignin-containing plant fiber anchored to the deprotected vinyl sulfone to the polymer. The lignin-containing plant fiber can be a hemp fiber, a flax fiber, a jute fiber, a sisal fiber, a kenaf fiber, a coconut husk fiber, or a coco coir fiber. The lignin-containing plant fiber can be a hemp fiber. The bifunctional linker can be 2-[(4-aminophenyl)sulfonyl]ethyl hydrogen sulfate. The activating step can include contacting the bifunctional linker with an aqueous $NaNO_2$ solution. The deprotecting step can include subjecting the reactive lignin-containing plant fiber anchored to the deprotected vinyl sulfone to basic conditions. The basic conditions can include a pH of from about 7.2 to about 9 (e.g., about 8). The deprotecting step can include subjecting the reactive lignin-containing plant fiber anchored to the deprotected vinyl sulfone to a temperature of from about 10° C. to about 40° C. The polymer can include PVA. The PVA can have a molecular weight of from about 1 kDa to about 2000 kDa (e.g., about 80 kDa). The polymer can include pectin. The method can be performed without producing formaldehyde, methylene chloride, or methanol. The plant fiber biocomposite can have a plant fiber content of from about 80 wt % to about 99 wt %.

In another aspect, this document features methods (e.g., water-based methods) for making a plant fiber biocomposite including a network of lignin-containing plant fibers cross-linked by a polymer. The methods can include, or consist essentially of: contacting a lignin-containing plant fiber with pectin to crosslink the lignin-containing plant fiber to the polymer. The lignin-containing plant fiber can be a hemp fiber, a flax fiber, a jute fiber, a sisal fiber, a kenaf fiber, a coconut husk fiber, or a coco coir fiber. The contacting can be performed under basic conditions (e.g., at a pH of from about 9 to about 14). The contacting can be performed under acidic conditions (e.g., at a pH of from about 0 to about 5). The contacting can include a temperature of from about 60° C. to about 100° C. The method can be performed without producing formaldehyde, methylene chloride, or methanol.

Unless otherwise defined, all technical and scientific terms used herein have the same meaning as commonly understood by one of ordinary skill in the art to which this invention pertains. Although methods and materials similar or equivalent to those described herein can be used to practice the invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

The details of one or more embodiments of the invention are set forth in the accompanying drawings and the description below. Other features, objects, and advantages of the invention will be apparent from the description and drawings, and from the claims.

DESCRIPTION OF THE DRAWINGS

Figure 2:
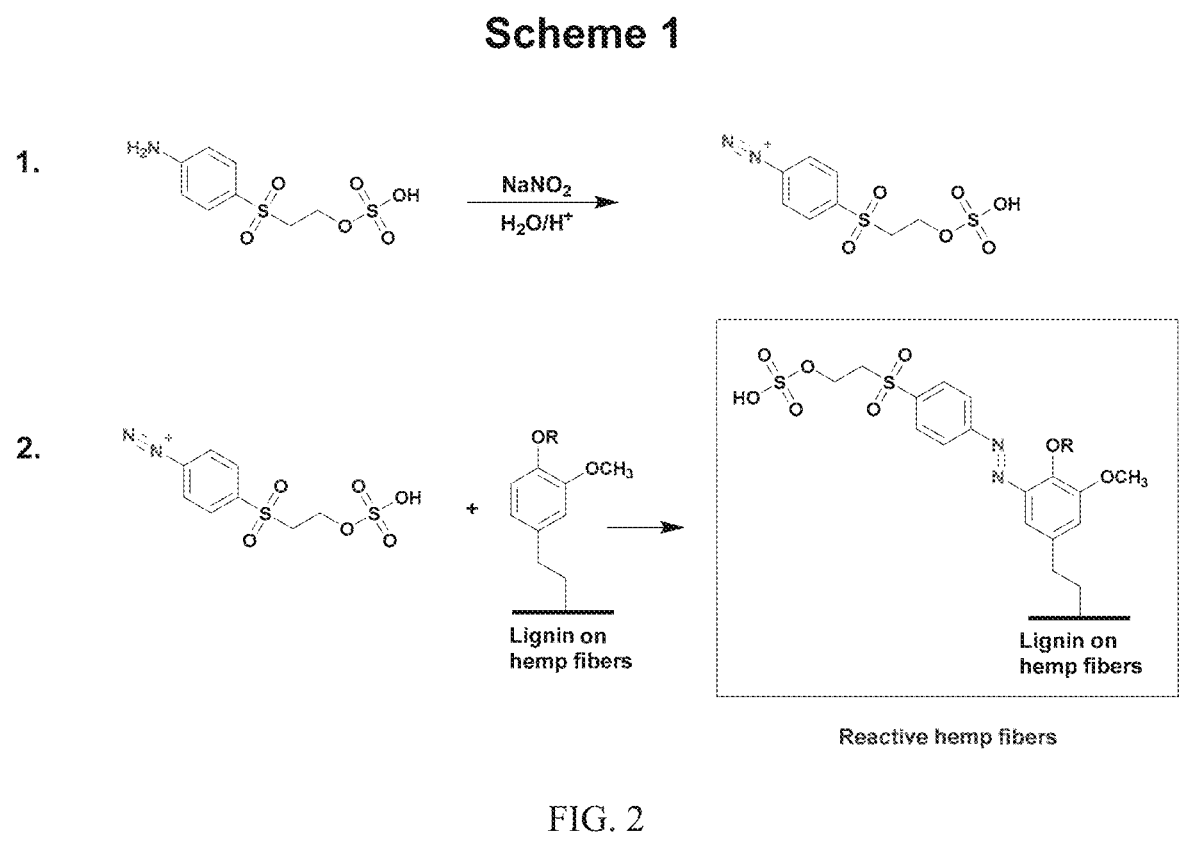

FIG. 2. Scheme 1. Reaction scheme showing the diazotization of the bifunctional linker in Step 1 and the attachment of the linker in Step 2 to form reactive hemp fibers.

Figure 4:
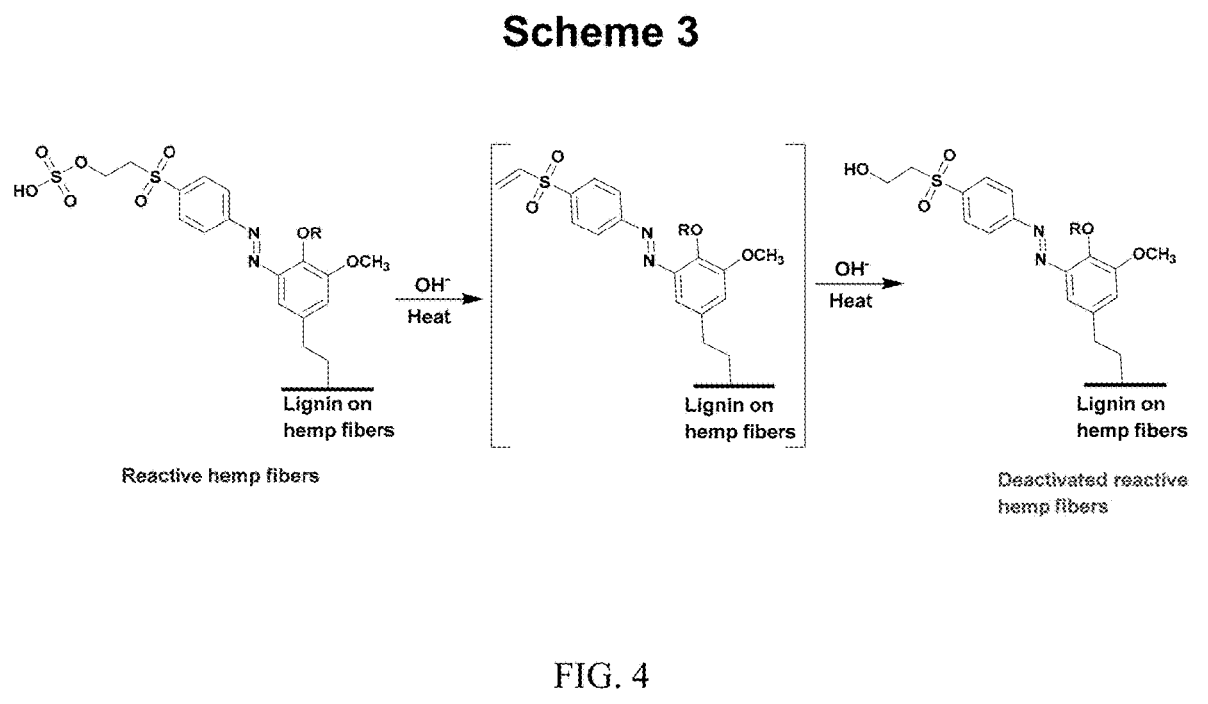

FIG. 4. Scheme 3. Reaction scheme showing the deactivation of reactive hemp fibers. The square bracket denotes the vinyl sulfone intermediate in the reaction.

FIGS. 8A and 8B. FIG. 8A. Plot showing the mechanical behavior of a cylindrical hemp fiber composite fabricated using a 3:10 weight ratio of the bifunctional linkers to hemp fibers and a control sample under compression. The compression rate was 2 mm/minute.

FIG. 8B. Plot showing variations of compression strength of hemp fiber composites made with different weight ratios of bifunctional linker to the hemp fiber. The error bars denote the standard deviation.

FIG. 35. Scheme 6. Reaction scheme depicting the crosslinking reaction between pectin and hemp fiber.

Figure 36:
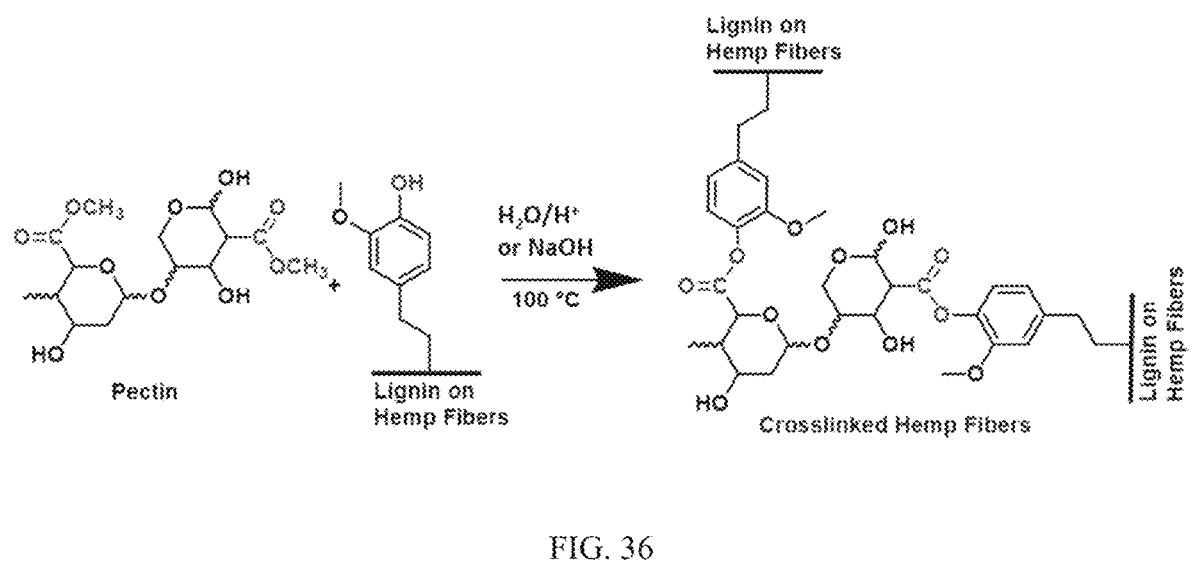

FIG. 36. Scheme 7. Reaction scheme depicting the transesterification reaction between pectin and lignin present within hemp fiber.

FIG. 38. Mechanical properties of hemp fiber composites fabricated with different weight ratios of bifunctional linkers to hemp fibers.

DETAILED DESCRIPTION

Figure 1:
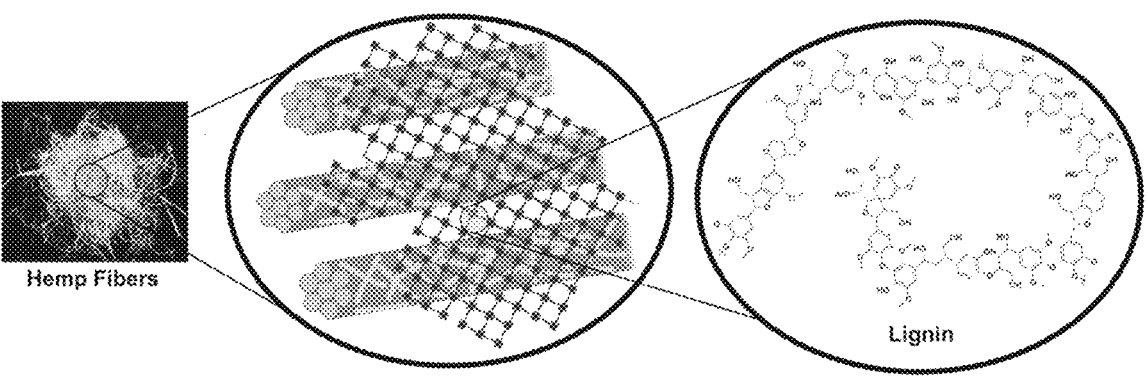
FIG. 1. Schematic showing different components of the hemp fibers. Cellulose strands (light grey cylinders) encapsulated by hemicellulose fibers (grey bead strings) and interwoven through lignin (dark grey checkers).
Figure 3:
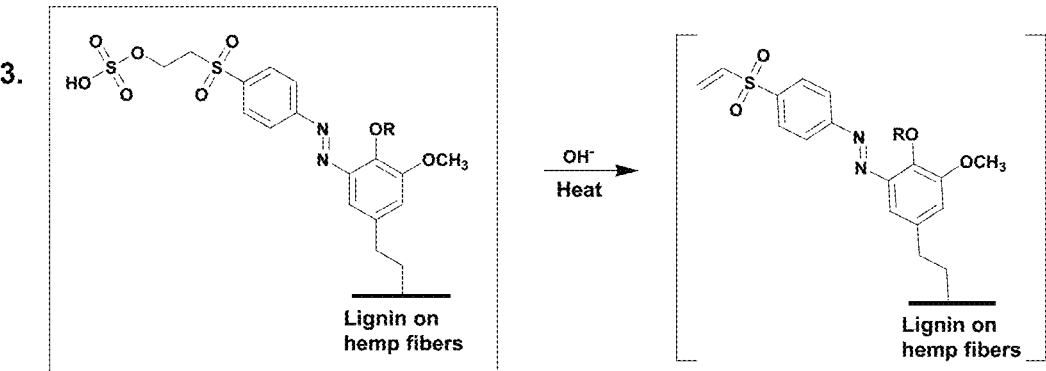
FIG. 3. Scheme 2. Reaction scheme showing the cross-linking of reactive hemp fibers with polyvinyl alcohol (PVA). The vinyl sulfone group of the reactive hemp fibers was deprotected in Step 3. The cross-linking of reactive hemp fibers (grey cyclinders) with PVA (light grey strands) was formed in a 1 inch-diameter quartz tube mold in Step 4. The square brackets denote the intermediate in the reaction.

This document provides methods and materials for making and using plant fiber (e.g., hemp fiber) biocomposites. For example, this document provides plant fiber (e.g., hemp fiber) biocomposites containing one or more lignin-containing plant fibers crosslinked by one or more polymers (e.g., PVA). In some cases, a plant fiber (e.g., hemp fiber) biocomposite provided herein can include a network of one or more lignin-containing plant fibers crosslinked by one or more polymers (e.g., PVA).

A plant fiber (e.g., hemp fiber) biocomposite provided herein (e.g., a hemp fiber biocomposite containing one or more lignin-containing plant fibers crosslinked by one or more polymers such as PVA or pectin) can include any appropriate plant fiber. In some cases, a plant fiber that can be used in a plant fiber biocomposite provided herein can have high lignin content. For example, the mass percent of lignin in a plant fiber that can be used in a plant fiber biocomposite provided herein can be greater than about 5%. For example, the mass percent of lignin in a plant fiber that can be used in a plant fiber biocomposite provided herein can be from about 5% to about 99.5% (e.g., from about 5% to about 90%, from about 5% to about 80%, from about 5% to about 70%, from about 5% to about 60%, from about 5% to about 50%, from about 5% to about 40%, from about 5% to about 30%, from about 5% to about 20%, from about 5% to about 1%, from about 10% to about 99.5%, from about 20% to about 99.5%, from about 30% to about 99.5%, from about 40% to about 99.5%, from about 50% to about 99.5%, from about 60% to about 99.5%, from about 70% to about 99.5%, from about 80% to about 99.5%, from about 90% to about 99.5%, from about 10% to about 90%, from about 20% to about 80%, from about 30% to about 70%, from about 40% to about 60%, from about 10% to about 30%, from about 30% to about 50%, from about 50% to about 70%, or from about 70% to about 90%). For example, a plant fiber that can be used in a plant fiber biocomposite provided herein can have from about 10 mass % to about 15 mass % lignin. In some cases, a plant fiber that can be used in a plant fiber biocomposite provided herein can be a bio-renewable plant fiber. Examples of plant fibers that can be used in a plant fiber biocomposite provided herein include, without limitation, hemp fibers, flax fibers, jute fibers, sisal fibers, kenaf fibers, coconut husk fibers, and coco coir fibers.

A plant fiber (e.g., hemp fiber) biocomposite provided herein (e.g., a hemp fiber biocomposite containing one or more lignin-containing plant fibers crosslinked by one or more polymers such as PVA or pectin) can include any amount of plant fiber. For example, a plant fiber biocomposite provided herein can include from about 60% (wt %) to about 98% (wt %) plant fiber (e.g., from about 60% (wt %) to about 95% (wt %), from about 60% (wt %) to about 90% (wt %), from about 60% (wt %) to about 85% (wt %), from about 60% (wt %) to about 80% (wt %), from about 60% (wt %) to about 75% (wt %), from about 65% (wt %) to about 98% (wt %), from about 70% (wt %) to about 98% (wt %), from about 75% (wt %) to about 98% (wt %), from about 80% (wt %) to about 98% (wt %), from about 85% (wt %) to about 98% (wt %), from about 90% (wt %) to about 98% (wt %), from about 95% (wt %) to about 98% (wt %), from about 66% (wt %) to about 96% (wt %), from about 70% (wt %) to about 90% (wt %), from about 75% (wt %) to about 85% (wt %), from about 70% (wt %) to about 80% (wt %), or from about 80% (wt %) to about 90% (wt %)). A plant fiber (e.g., hemp fiber) biocomposite provided herein (e.g., a hemp fiber biocomposite containing one or more lignin-containing plant fibers crosslinked by one or more polymers such as PVA or pectin) can include any appropriate polymer. A "polymer" is a molecule of repeating structural units (e.g., monomers) formed via a chemical reaction, i.e., polymerization. In some cases, a polymer can be a water-soluble polymer. A polymer can be natural polymer or a synthetic polymer. In some cases, a polymer can be a biodegradable polymer. In some cases, a polymer can be a biocompatible polymer. In some cases, a polymer can include one or more hydroxyl functional groups. Examples of polymers that can be used in a plant fiber biocomposite provided herein include, without limitation, PVA, pectin, starch, cellulose, and any combinations thereof. A polymer can have any appropriate molecular weight (MW; e.g., an average MW). For example, a polymer (e.g., PVA) that can be used in a plant fiber biocomposite provided herein can have a molecular weight of from about 1 kilodaltons (kDa) to about 2000 kDa (e.g., from about 1 kDa to about 1500 kDa, from about 1 kDa to about 1200 kDa, from about 1 kDa to about 1000 kDa, from about 1 kDa to about 800 kDa, from about 1 kDa to about 600 kDa, from about 1 kDa to about 400 kDa, from about 1 kDa to about 200 kDa, from about 1 kDa to about 100 kDa, from about 1 kDa to about 50 kDa, from about 50 kDa to about 2000 kDa, from about 100 kDa to about 2000 kDa, from about 500 kDa to about 2000 kDa, from about 1000 kDa to about 2000 kDa, from about 1200 kDa to about 2000 kDa, from about 1500 kDa to about 2000 kDa, from about 50 kDa to about 1500 kDa, from about 100 kDa to about 1000 kDa, from about 300 kDa to about 600 kDa, from about 50 kDa to about 150 kDa, from about 100 kDa to about 300 kDa, from about 200 kDa to about 500 kDa, from about 500 kDa to about 800 kDa, or from about 800 kDa to about 1200 kDa). For example, when a polymer is a PVA, the PVA can have a MW of about 80 kDa. Unless otherwise specified, polymer MWs provided herein are weight average MW. In some cases, a polymer can be a copolymer (e.g., can be formed from polymerization of two or more different monomers). When a polymer is a copolymer, the copolymer can be any type of copolymer (e.g., a linear copolymer or a branched copolymer).

A plant fiber (e.g., hemp fiber) biocomposite provided herein (e.g., a hemp fiber biocomposite containing one or more lignin-containing plant fibers crosslinked by one or more polymers such as PVA or pectin) can include any amount of polymer. For example, a plant fiber biocomposite provided herein can include from about 0.5% (wt %) to about 40% (wt %) polymer (e.g., from about 0.5% (wt %) to about 30% (wt %), from about 0.5% (wt %) to about 20% (wt %), from about 0.5% (wt %) to about 10% (wt %), from about 0.5% (wt %) to about 5% (wt %), from about 1% (wt %) to about 40% (wt %), from about 5% (wt %) to about 40% (wt %), from about 10% (wt %) to about 40% (wt %), from about 20% (wt %) to about 40% (wt %), from about 30% (wt %) to about 40% (wt %), from about 1% (wt %) to about 30% (wt %), from about 5% (wt %) to about 25% (wt %), from about 10% (wt %) to about 20% (wt %), from about 1% (wt %) to about 10% (wt %), from about 10% (wt %) to about 20% (wt %), or from about 20% (wt %) to about 340% (wt %) polymer).

A plant fiber (e.g., hemp fiber) biocomposite provided herein (e.g., a hemp fiber biocomposite containing one or more lignin-containing plant fibers crosslinked by one or more polymers such as PVA or pectin) can include a linker between a lignin-containing plant fiber and a polymer.

In some cases, a plant fiber (e.g., hemp fiber) biocomposite provided herein (e.g., a hemp fiber biocomposite containing one or more lignin-containing plant fibers cross-linked by one or more polymers such as PVA or pectin) can be strong. For example, a plant fiber biocomposite provided herein can have a compressive strength of from about 0.5 megapascal (MPa) to about 3 MPa (e.g., from about 0.5 MPa to about 2.5 MPa, from about 0.5 MPa to about 2 MPa, from about 0.5 MPa to about 1.5 MPa, from about 0.5 MPa to about 1 MPa, from about 1 MPa to about 3 MPa, from about 1.5 MPa to about 3 MPa, from about 2.0 MPa to about 3 MPa, from about 2.5 MPa to about 3 MPa, from about 1 MPa to about 2.5 MPa, from about 1.5 MPa to about 2 MPa, from about 1 MPa to about 2 MPa, or from about 1.5 MPa to about 2.5 MPa). In some cases, a plant fiber biocomposite provided herein can have a compressive strength of about 1.64 MPa.

Any appropriate method can be used to determine the strength of a plant fiber (e.g., hemp fiber) biocomposite provided herein (e.g., a hemp fiber biocomposite containing one or more lignin-containing plant fibers crosslinked by one or more polymers such as PVA or pectin). For example, compressive mechanical tests, and/or tensile mechanical tests can be used to determine the strength of a plant fiber biocomposite provided herein. In some cases, the strength of a plant fiber biocomposite provided herein can be determined as described in Example 1.

In some cases, a plant fiber (e.g., hemp fiber) biocomposite provided herein (e.g., a hemp fiber biocomposite containing one or more lignin-containing plant fibers cross-linked by one or more polymers such as PVA or pectin) can retain moisture (e.g., when exposed to a liquid such as water). For example, a plant fiber biocomposite provided herein, when exposed to a liquid (e.g., water), can have a water retention/holding capacity of from about 5% to about 20% (e.g., from about 5% to about 15%, from about 5% to about 10%, from about 5% to about 8%, from about 7% to about 20%, from about 10% to about 20%, from about 12% to about 20%, from about 15% to about 20%, from about 8% to about 17%, from about 10% to about 15%, from about 10% to about 12%, or from about 12% to about 15%). In some cases, a plant fiber biocomposite provided herein, when exposed to a liquid (e.g., water), can have a water retention/holding capacity of about 13.4±1.7%.

Any appropriate method can be used to determine the water retention/holding capacity of a plant fiber (e.g., hemp fiber) biocomposite provided herein (e.g., a hemp fiber biocomposite containing one or more lignin-containing plant fibers crosslinked by one or more polymers such as PVA or pectin). For example, the water retention/holding capacity of a plant fiber biocomposite provided herein can be determined as described in, for example, Gessert (*Ornamentals Northwest,* 1976, 1:11-12). In some cases, the water retention/holding capacity of a plant fiber biocomposite provided herein can be determined as described in Example 1.

In some cases, a plant fiber (e.g., hemp fiber) biocomposite provided herein (e.g., a hemp fiber biocomposite containing one or more lignin-containing plant fibers cross-linked by one or more polymers such as PVA or pectin) can contain carbon and nitrogen. For example, a plant fiber biocomposite provided herein can have a carbon/nitrogen (C/N) ratio of at least 30. In some cases, a plant fiber biocomposite provided herein can have a C/N ratio of from about 30 to about 35 (e.g., from about 30 to about 34, from about 30 to about 33, from about 30 to about 32, from about 30 to about 31, from about 31 to about 35, from about 32 to about 35, from about 33 to about 35, from about 34 to about 35, from about 35 to about 35, from about 31 to about 34, or from about 32 to about 33).

Any appropriate method can be used to determine the C/N ratio of a plant fiber (e.g., hemp fiber) biocomposite provided herein (e.g., a hemp fiber biocomposite containing one or more lignin-containing plant fibers crosslinked by one or more polymers such as PVA or pectin). For example, a dumas combustion technique, and/or elemental analysis techniques (e.g., energy-dispersive X-ray spectroscopy) can be used to determine the C/N ratio of a plant fiber biocomposite provided herein. In some cases, the C/N ratio of a plant fiber biocomposite provided herein can be determined as described in Example 1.

In some cases, a plant fiber (e.g., hemp fiber) biocomposite provided herein (e.g., a hemp fiber biocomposite containing one or more lignin-containing plant fibers cross-linked by one or more polymers such as PVA or pectin) can be electrically conductive (e.g., when exposed to a liquid such as water). For example, a plant fiber biocomposite provided herein can have an electrical conductivity when exposed to a liquid (e.g., water) of less than about 2 milliSiemens per centimeter ($mS \cdot cm^{-1}$). In some cases, a plant fiber biocomposite provided herein can have an electrical conductivity when exposed to a liquid (e.g., water) of from about 0.4 $mS \cdot cm^{-1}$ to about 0.5 $mS \cdot cm^{-1}$ (e.g., about 0.48 $mS \cdot cm^{-1}$). In some cases, the electrical conductivity of a plant fiber biocomposite provided herein can be indicative of the salinity of the plant fiber biocomposite.

Any appropriate method can be used to determine the electrical conductivity of a plant fiber (e.g., hemp fiber) biocomposite provided herein (e.g., a hemp fiber biocomposite containing one or more lignin-containing plant fibers crosslinked by one or more polymers such as PVA or pectin). For example, an EC probe can be used to determine the electrical conductivity of a plant fiber biocomposite provided herein. In some cases, the electrical conductivity of a plant fiber biocomposite provided herein can be determined as described in Example 1.

In some cases, a plant fiber (e.g., hemp fiber) biocomposite provided herein (e.g., a hemp fiber biocomposite containing one or more lignin-containing plant fibers cross-linked by one or more polymers such as PVA or pectin) can have any appropriate pH (e.g., when exposed to a liquid such as water). For example, a plant fiber biocomposite provided herein, when exposed to a liquid (e.g., water), can have a pH of from about 7.2 to about 9 (e.g., from about 7.2 to about 8.6, from about 7.2 to about 8.3, from about 7.2 to about 8, from about 7.2 to about 7.5, from about 7.5 to about 9, from about 7.8 to about 9, from about 8 to about 9, from about 8.4 to about 9, from about 7.5 to about 8.5, from about 7.5 to about 8, from about 8 to about 8.5, or from about 8.5 to about 9). In some cases, a plant fiber biocomposite provided herein can have a pH, when exposed to a liquid (e.g., water), of about 7.8. In some cases, the pH of a plant fiber biocomposite provided herein (e.g., a wet plant fiber biocomposite) can be indicative of the ability of the plant fiber biocomposite control mineral deficiencies. In some cases, the pH of a plant fiber biocomposite provided herein (e.g., a wet plant fiber biocomposite) can be indicative of the ability of the plant fiber biocomposite control toxicities.

Any appropriate method can be used to determine the pH of a plant fiber (e.g., hemp fiber) biocomposite provided herein (e.g., a hemp fiber biocomposite containing one or more lignin-containing plant fibers crosslinked by one or more polymers such as PVA or pectin). For example, dual pH electrodes can be used to determine the pH of a plant fiber biocomposite provided herein. In some cases, the pH of a plant fiber biocomposite provided herein can be determined as described in Example 1.

This document also provides methods for making plant fiber (e.g., hemp fiber) biocomposites containing one or more lignin-containing plant fibers crosslinked by one or more polymers (e.g., PVA). In some cases, the methods can include water-based reactions. For example, plant fiber (e.g., hemp fiber) biocomposites provided herein (e.g., hemp fiber biocomposites containing one or more lignin-containing plant fibers crosslinked by one or more polymers such as PVA) can be made by using a bifunctional linker (e.g., a bifunctional linker containing an aromatic amine and a protected vinyl sulfone). In some cases, a first functional end of a bifunctional linker can react with one or more lignin molecules in a lignin-containing plant fiber to form a reactive lignin-containing plant fiber, and a second end of a bifunctional linker can crosslink a plurality of reactive lignin-containing plant fibers with one or more polymers (e.g., PVA) to form a plant fiber (e.g., hemp fiber) biocomposite provided herein (e.g., a hemp fiber biocomposite containing one or more lignin-containing plant fibers crosslinked by one or more polymers such as PVA). For example, plant fiber (e.g., hemp fiber) biocomposites provided herein (e.g., hemp fiber biocomposites containing one or more lignin-containing plant fibers crosslinked by one or more polymers such as PVA) can be used as a hydroponic growth medium.

In some cases, methods (e.g., water-based reactions) for making a plant fiber (e.g., hemp fiber) biocomposite provided herein (e.g., a hemp fiber biocomposite containing one or more lignin-containing plant fibers crosslinked by one or more polymers such as PVA or pectin) are environmentally friendly or eco-friendly. For example, methods for making a plant fiber biocomposite provided herein can be performed in water. For example, methods for making a plant fiber biocomposite provided herein can be performed without producing harsh chemical by-products (e.g., formaldehyde, methylene chloride, and methanol). For example, methods for making a plant fiber biocomposite provided herein can be performed without any harsh conditions (e.g., the presence of formaldehyde, methylene chloride, and methanol).

In some cases, methods (e.g., water-based reactions) for making a plant fiber (e.g., hemp fiber) biocomposite provided herein (e.g., a hemp fiber biocomposite containing one or more lignin-containing plant fibers crosslinked by one or more polymers such as PVA or pectin) can result in a plant fiber biocomposite having an improved plant fiber content. For example, methods for making a plant fiber biocomposite provided herein can yield a biocomposite having a plant fiber content of from about 80 wt % to about 99 wt % (e.g., from about 80 wt % to about 95 wt %, from about 80 wt % to about 93 wt %, from about 80 wt % to about 90 wt %, from about 80 wt % to about 85 wt %, from about 85 wt % to about 99 wt %, from about 88 wt % to about 99 wt %, from about 90 wt % to about 99 wt %, from about 93 wt % to about 99 wt %, from about 95 wt % to about 99 wt %, from about 85 wt % to about 95 wt %, from about 83 wt % to about 90 wt %, or from about 88 wt % to about 93 wt %).

Any appropriate bifunctional linker can be used to crosslink one or more lignin-containing plant fibers (e.g., one or more lignin-containing hemp fibers) to one or more polymers (e.g., PVA). A bifunctional linker that can be used to crosslink one or more lignin-containing plant fibers to one or more polymers as described herein can include an aromatic amine on a first end of the bifunctional linker and can include a protected vinyl sulfone on a second end of the bifunctional linker. An exemplary bifunctional linker that includes an aromatic amine on a first end of the bifunctional linker and a protected vinyl sulfone on a second end of the bifunctional linker and can be used to crosslink one or more lignin-containing plant fibers to one or more polymers to make a plant fiber biocomposite provided herein is 2-[(4-aminophenyl)sulfonyl]ethyl hydrogen sulfate.

In some cases, methods (e.g., water-based reactions) for making a plant fiber (e.g., hemp fiber) biocomposite provided herein (e.g., a hemp fiber biocomposite containing one or more lignin-containing plant fibers crosslinked by one or more polymers such as PVA) can include activating lignin within a lignin-containing plant fiber to generate a reactive lignin-containing plant fiber. For example, a nitrogen present in an aromatic amine on a first end of the bifunctional linker can be converted to an electrophilic diazonium salt, and the electrophilic diazonium salt can react with electron-rich naphthalene rings of lignin within the lignin-containing plant fiber to form a reactive lignin-containing plant fiber (e.g., a lignin-containing plant fiber anchored to a protected vinyl sulfone on a second end of the bifunctional linker).

Any appropriate method can be used to convert a nitrogen present in an aromatic amine to an electrophilic diazonium salt. In some cases, a bifunctional linker can be contacted with a $H_2SO_4$ (e.g., a solution such as an aqueous solution containing 10% $H_2SO_4$). For example, a slurry of a bifunctional linker (e.g., 2-[(4-aminophenyl)sulfonyl]ethyl hydrogen sulfate) can be contacted with an aqueous solution containing 10% $H_2SO_4$ over from about 10 minutes to about 30 minutes under constant stirring to convert a nitrogen present in an aromatic amine to an electrophilic diazonium salt. In some cases, a bifunctional linker can be contacted with a $NaNO_2$ (e.g., a solution such as an aqueous solution containing 20% $NaNO_2$). For example, a slurry of a bifunctional linker (e.g., 2-[(4-Aminophenyl)sulfonyl]ethyl hydrogen sulfate) can be contacted with an aqueous solution containing 20% $NaNO_2$ over from about 10 minutes to about 30 minutes under constant stirring to convert a nitrogen present in an aromatic amine to an electrophilic diazonium salt.

Once a bifunctional linker described herein (e.g., 2-[(4-aminophenyl)sulfonyl]ethyl hydrogen sulfate) has been converted to an electrophilic diazonium salt, the electrophilic diazonium salt can be contacted with plant fibers (e.g., lignin-containing plant fibers). Plant fibers can be contacted with a bifunctional linker that has been converted to an electrophilic diazonium salt in any appropriate form. In some cases, plant fibers can be contacted with a bifunctional linker that has been converted to an electrophilic diazonium salt as a powder. For example, plant fiber powder can be added to a slurry containing a bifunctional linker that has been converted to an electrophilic diazonium salt. In some cases, plant fibers can be contacted with a bifunctional linker that has been converted to an electrophilic diazonium salt as an aqueous solution.

In some cases, water can be added to a slurry containing plant fibers and a bifunctional linker that has been converted to an electrophilic diazonium salt.

In some cases, one or more compounds that can alter pH can be added to a slurry containing plant fibers and a bifunctional linker that has been converted to an electrophilic diazonium salt. For example, $NaHCO_3$ can be added to a slurry containing plant fibers and a bifunctional linker that has been converted to an electrophilic diazonium salt to maintain the pH of the slurry at from about 4 to about 5.

In some cases, a reactive lignin-containing plant fiber can be dried. For example, a reactive lignin-containing plant fiber can be dried in an oven at about 90° C.

In some cases, lignin within a lignin-containing plant fiber can be activated to generate a reactive lignin-containing plant fiber as described in Example 1. For example, lignin within a lignin-containing plant fiber can be activated to generate a reactive lignin-containing plant fiber as described in Scheme 1.

In some cases, methods (e.g., water-based reactions) for making a plant fiber (e.g., hemp fiber) biocomposite provided herein (e.g., a hemp fiber biocomposite containing one or more lignin-containing plant fibers crosslinked by one or more polymers such as PVA) can include crosslinking a reactive lignin-containing plant fiber with a polymer (e.g., PVA). For example, a protected vinyl sulfone present on a second end of the bifunctional linker can be deprotected to yield the vinyl sulfone, and the yield the vinyl sulfone can react with one or more polymers to crosslink the reactive lignin-containing plant fiber to the polymer(s) and form a plant fiber biocomposite containing one or more lignin-containing plant fibers crosslinked by one or more polymers.

Any appropriate method can be used to deprotect a protected vinyl sulfone present on a second end of the bifunctional linker. In some cases, a protected vinyl sulfone present on a second end of the bifunctional linker can be deprotected under basic conditions. For example, a protected vinyl sulfone present on a second end of the bifunctional linker can be deprotected at a pH of from about 8 to about 10 (e.g., about pH 8). In some cases, a protected vinyl sulfone present on a second end of the bifunctional linker can be deprotected at an elevated temperature (e.g., as compared to room temperature). For example, a protected vinyl sulfone present on a second end of the bifunctional linker can be deprotected at from about 10° C. to about 40° C. (e.g., from about 10° C. to about 35° C., from about 10° C. to about 30° C., from about 10° C. to about 25° C., from about 10° C. to about 20° C., from about 15° C. to about 40° C., from about 20° C. to about 40° C., from about 25° C. to about 40° C., from about 30° C. to about 40° C., or from about 20° C. to about 30° C.).

In some cases, a protected vinyl sulfone present on a second end of the bifunctional linker can be deprotected as described in Example 1. For example, a protected vinyl sulfone present on a second end of the bifunctional linker can be deprotected as described in Scheme 2.

Once a vinyl sulfone present on a second end of the bifunctional linker described herein (e.g., 2-[(4-aminophenyl)sulfonyl]ethyl hydrogen sulfate) has been deprotected, the deprotected vinyl sulfone anchored to a reactive lignin-containing plant fiber can be contacted with one or more polymers (e.g., PVA). For example, a deprotected vinyl sulfone anchored to a reactive lignin-containing plant fiber can be contacted with one or more polymers to crosslink the reactive lignin-containing plant fiber to the polymer(s) and form a plant fiber biocomposite containing one or more lignin-containing plant fibers crosslinked by one or more polymers.

In some cases, methods (e.g., water-based reactions) for making a plant fiber (e.g., hemp fiber) biocomposite provided herein (e.g., a hemp fiber biocomposite containing one or more lignin-containing plant fibers crosslinked by one or more polymers such as pectin) can include cross-linking lignin within a lignin-containing plant fiber with pectin. In some cases, pectin can be a multifunctional linker (e.g., can include one or more methyl ester sites). In some cases, pectin can be (e.g., can be obtained from) a naturally occurring source. In some cases, pectin can include galacturonans methyl-esterified by pectin methyltransferase polypeptides. When pectin includes one or more methyl ester sites, the pectin can include any appropriate degree of methyl esterification. In some cases, pectin can have a high degree of esterification (e.g., can include methyl esters on from about 50% to about 95% of the galacturonans present in the pectin). For example, pectin can include methyl esters on from about 50% to about 95% (e.g., from about 50% to about 90%, from about 50% to about 80%, from about 50% to about 70%, from about 50% to about 60%, from about 60% to about 95%, from about 70% to about 95%, from about 80% to about 95%, from about 90% to about 95%, from about 60% to about 90%, from about 70% to about 80%, from about 60% to about 70%, from about 70% to about 80%, or from about 80% to about 90%) of the galacturonans present in the pectin. In some cases, pectin can have a low degree of esterification (e.g., can include methyl esters on less than about 50% of the galacturonans present in the pectin). For example, pectin can include methyl esters on less than about 50% (e.g., less than about 45%, less than about 40%, less than about 30%, less than about 20%, or less than about 10%) of the galacturonans present in the pectin. In some cases, pectin can have methyl esterifications on about 20% of the galacturonans present in the pectin. In some cases, pectin can lack methyl esterifications on the galacturonans present in the pectin. For example, a lignin-containing plant fiber can be contacted with pectin under basic conditions (e.g., having a pH of from about 9 to about 14) to cross-link lignin within the lignin-containing plant fiber to form a plant fiber (e.g., hemp fiber) biocomposite provided herein (e.g., a hemp fiber biocomposite containing one or more lignin-containing plant fibers crosslinked by one or more polymers such as pectin). For example, a lignin-containing plant fiber can be contacted with pectin under acidic conditions (e.g., having a pH of from about 0 to about 5) to cross-link lignin within the lignin-containing plant fiber to form a plant fiber (e.g., hemp fiber) biocomposite provided herein (e.g., a hemp fiber biocomposite containing one or more lignin-containing plant fibers crosslinked by one or more polymers such as pectin). In some cases, methods (e.g., water-based reactions) for making a plant fiber (e.g., hemp fiber) biocomposite provided herein that include cross-linking lignin within a lignin-containing plant fiber with pectin are not performed under neutral conditions (e.g., having a pH of from about 6 to about 8).

In some cases, an aqueous pectin solution (e.g., a 10 wt. % aqueous pectin solution) can be added to a slurry containing plant fibers. For example, an aqueous pectin solution containing from about 5 wt. % to about 50 wt. % (e.g., from about 5 wt. % to about 40 wt. %, from about 5 wt. % to about 30 wt. %, from about 5 wt. % to about 20 wt. %, from about 5 wt. % to about 10 wt. %, from about 10 wt. % to about 50 wt. %, from about 20 wt. % to about 50 wt. %, from about 30 wt. % to about 50 wt. %, from about 40 wt. % to about 50 wt. %, from about 10 wt. % to about 40 wt. %, from about 20 wt. % to about 30 wt. %, from about 10 wt. % to about 20 wt. %, from about 30 wt. % to about 40 wt. %, or about 10 wt. %) aqueous pectin can be added to a slurry containing plant fibers.

An aqueous pectin solution can include any appropriate amount of pectin. In some cases, an aqueous pectin solution can include at least 10 wt. % (e.g., about 10%, about 12%, about 15%, about 18% about 20%, about 25%, or more) pectin.

An aqueous pectin solution (e.g., a 10 wt. % aqueous pectin solution) can be added to a slurry containing plant fibers at any appropriate temperature. For example, an aqueous pectin solution can be contacted with a slurry containing plant fibers at from about 60° C. to about 100° C. (e.g., from about 60° C. to about 90° C., from about 60° C. to about 80° C., from about 60° C. to about 70° C., from about 70° C. to about 100° C., from about 80° C. to about 100° C., from about 90° C. to about 100° C., from about 70° C. to about 90° C., from about 70° C. to about 80° C., or from about 80° C. to about 90° C.).

In some cases, one or more compounds that can alter pH can be added to a slurry containing an aqueous pectin solution and plant fibers. For example, a base (e.g., NaOH and trisodium citrate) can be added to a slurry containing an aqueous pectin solution and plant fibers to maintain the pH of the slurry at from about 9 to about 14 (e.g., from about 10 to about 13, from about 10 to about 12, from about 10 to about 11, from about 11 to about 14, from about 12 to about 14, from about 13 to about 14, from about 11 to about 13, about 9, about 10, about 11, about 12, about 13, or about 14).

In some cases, one or more compounds that can alter pH can be added to a slurry containing an aqueous pectin solution and plant fibers. For example, an acid (e.g., HCl acetic acid, citric acidic, and lemon juice) can be added to a slurry containing an aqueous pectin solution and plant fibers to maintain the pH of the slurry at from about 0 to about 5 (e.g., from about 0 to about 4, from about 0 to about 3, from about 0 to about 2, from about 0 to about 1, from about 1 to about 5, from about 2 to about 5, from about 3 to about 5, from about 4 to about 5, from about 1 to about 4, from about 2 to about 3, from about 1 to about 2, from about 3 to about 4, about 0, about 1, about 2, about 3, about 4, or about 5).

In some cases, a slurry containing an aqueous pectin solution and plant fibers can be dried. For example, a slurry containing an aqueous pectin solution and plant fibers can be dried in an oven at about 100° C.

In some cases, methods (e.g., water-based reactions) for making a plant fiber (e.g., hemp fiber) biocomposite provided herein (e.g., a hemp fiber biocomposite containing one or more lignin-containing plant fibers crosslinked by one or more polymers such as pectin) can include contacting a lignin-containing plant fiber with pectin containing a high degree of esterification (e.g., including methyl esters on from about 50% to about 95% of the galacturonans present in the pectin) under acidic conditions (e.g., at a pH of from about 0 to about 5).

In some cases, methods (e.g., water-based reactions) for making a plant fiber (e.g., hemp fiber) biocomposite provided herein (e.g., a hemp fiber biocomposite containing one or more lignin-containing plant fibers crosslinked by one or more polymers such as pectin) can include contacting a lignin-containing plant fiber with pectin containing a high degree of esterification (e.g., including methyl esters on from about 50% to about 95% of the galacturonans present in the pectin) under basic conditions (e.g., having a pH of from about 9 to about 14).

In some cases, methods (e.g., water-based reactions) for making a plant fiber (e.g., hemp fiber) biocomposite provided herein (e.g., a hemp fiber biocomposite containing one or more lignin-containing plant fibers crosslinked by one or more polymers such as pectin) can include contacting a lignin-containing plant fiber with pectin containing a low degree of esterification (e.g., including methyl esters on less than about 50% of the galacturonans present in the pectin) under basic conditions (e.g., having a pH of from about 9 to about 14).

In some cases, a plant fiber (e.g., hemp fiber) biocomposite provided herein (e.g., a hemp fiber biocomposite containing one or more lignin-containing plant fibers crosslinked by one or more polymers such as pectin) can be made as described in Example 4.

In some cases, a plant fiber (e.g., hemp fiber) biocomposite provided herein (e.g., a hemp fiber biocomposite containing one or more lignin-containing plant fibers crosslinked by one or more polymers such as pectin) can be made as described in Scheme 6 or Scheme 7.

In some cases, methods (e.g., water-based reactions) for making a plant fiber (e.g., hemp fiber) biocomposite provided herein (e.g., a hemp fiber biocomposite containing one or more lignin-containing plant fibers crosslinked by one or more polymers such as PVA or pectin) can include forming the plant fiber biocomposite into a particular shape. For example, a plant fiber biocomposite made as described herein can formed into a particular shape using a mold (e.g., by packing the plant fiber biocomposite into a mold). For example, methods for making a plant fiber biocomposite provided herein can be performed within a mold to form the plant fiber biocomposite into the shape of the mold.

When a plant fiber (e.g., hemp fiber) biocomposite provided herein (e.g., a hemp fiber biocomposite containing one or more lignin-containing plant fibers crosslinked by one or more polymers such as PVA or pectin) is formed into a particular shape, the shape can be any shape (e.g., polygonal shapes and irregular shapes). Examples of shapes that a plant fiber biocomposite provided herein can be formed into include, without limitation, tubes, spheres, cubes, rods, rectangles, and sheets.

This document also provides methods for using plant fiber (e.g., hemp fiber) biocomposites containing one or more lignin-containing plant fibers crosslinked by one or more polymers (e.g., PVA). For example, this document provides hydroponic growth media including plant fiber (e.g., hemp fiber) biocomposites provided herein (e.g., hemp fiber biocomposites containing a network of one or more lignin-containing plant fibers crosslinked by one or more polymers such as PVA or pectin).

In some cases, a plant fiber (e.g., hemp fiber) biocomposite provided herein (e.g., a hemp fiber biocomposite containing one or more lignin-containing plant fibers crosslinked by one or more polymers such as PVA or pectin) can be used as a hydroponic growth media. For example, a plant fiber biocomposite provided herein can be used to grow one or more plants in a hydroponic system. A plant fiber biocomposite provided herein can be used to grow any appropriate plan in a hydroponic system. In some cases, a plant can be an ornamental plant. In some cases, a plant can be a food plant. Examples of plants that can be grown in a hydroponic system using a plant fiber biocomposite provided herein as a hydroponic growth media include, without limitation, radishes, lettuce, spinach, strawberries, peppers, herbs, broccoli, cucumber, kale, jalapenos, green peas, and tomatoes.

In some cases, a plant fiber (e.g., hemp fiber) biocomposite provided herein (e.g., a hemp fiber biocomposite containing one or more lignin-containing plant fibers crosslinked by one or more polymers such as PVA or pectin) can be used in ways other than as a plant growth media. For example, plant fiber (e.g., hemp fiber) biocomposites containing one or more lignin-containing plant fibers crosslinked by one or more polymers (e.g., PVA) can be used as packing material, particle board, car panels, light-weight panels, prosthetics, carpeting materials, building materials, clothing materials, paper like materials for stationery, sporting goods, or decorative accessories.

The invention will be further described in the following examples, which do not limit the scope of the invention described in the claims.

EXAMPLES

Example 1: Eco-Friendly Fabrication of Hemp Fiber Biocomposites Via Diazonium-Based Reactions with Hemp Lignin for Hydroponic Application This Example describes a synthetic approach for making hemp fiber biocomposites through the synthesis of reactive forms of lignin-based hemp materials with a bifunctional linker. This hemp fiber biocomposite was then studied as hydroponic growth media to grow daikon radish (*Raphanus sativus* var. Longipinnatus) plants for three weeks. Mechanical compression studies were also performed on these composites to check their durability. Properties of this hemp fiber biocomposite including water retention capacity values, porosity, carbon/nitrogen (C/N) ratio, and substrate salinity (electrical conductivity) were investigated to determine their suitability for hydroponics applications.

Materials and Methods

Materials

The hemp fibers for this study were obtained from eBay. The bifunctional linker, 2-[(4-aminophenyl)sulfonyl]ethyl hydrogen sulfate, was purchased from Alfa Chemistry (Ronkonkoma, NY). Polyvinyl alcohol (PVA) with molar mass 80 kDa was bought from Sigma-Aldrich (St. Louis, MO). Concentrated sulphuric acid ($H_2SO_4$), sodium nitrite ($NaNO_2$), sodium bicarbonate ($NaHCO_3$), and sodium hydroxide (NaOH) were from J. T. Baker (Radnor, PA). The liquid plant food (AeroGarden Liquid Nutrient), the growth baskets, and the commercial peat moss composite growth media were obtained from AeroGarden (AeroGrow Inc., Boulder, CO). All chemicals were used as purchased. The plant growth studies were carried out in a "Sprout" hydroponic system from AeroGarden (AeroGrow Inc., Boulder, CO). The system was equipped with a pump for oxygenation and a 10 W full spectrum grow light.

Fabrication of Hemp Fiber Composite

Synthesis of Reactive Hemp Powders

Reactive hemp powders were synthesized using four different weight ratios of bifunctional linkers to hemp fibers (3:5, 3:10, 3:20, and 3:40) to evaluate the dependency of this factor on the resulting mechanical strength of the fabricated hemp composites. For example, to synthesize reactive hemp powder with a 3:10 weight ratio of bifunctional linkers to hemp fibers, a slurry of 2-[(4-aminophenyl)sulfonyl]ethyl hydrogen sulfate (9 g, 0.032 moles) was first obtained by adding 100 mL of tap water and 100 g of ice to the chemical in a 1 L beaker, followed by 30 minutes of stirring. Afterward, a 30 mL of 10% $H_2SO_4$ aqueous solution was added to the slurry and the mixture was stirred for 5 minutes. An aqueous solution containing 20% $NaNO_2$ (2.35 g, 0.034 moles) was added dropwise to the subsurface of the slurry over 10 minutes while the slurry was under constant stirring. The slurry was stirred for an additional 30 minutes. 30 g of hemp powder was made by pulverizing hemp fibers using a blender. They were sieved to remove particles >2 mm and the resulting powder was then added to the slurry. Water (150-200 mL) was added as needed to the reaction mixture to aid in stirring. Stirring became easier as the reaction proceeded. The reaction mixture was stirred for an additional 8 hours while maintaining the pH at 4 to 5 through the addition of $NaHCO_3$ at room temperature. The color of the reaction mixture changed from a pale brown color to deep burgundy red, indicating the formation of the diazo bond. The final reactive hemp powder was transferred to a tray and was dried in an oven at 100° C. overnight to yield a burgundy powder product (Scheme 1).

Cross-Linking of Hemp Fiber Powder with PVA Via the Michael Addition 16 g of 8 wt. % PVA aqueous solution was mixed with 4 g of the burgundy reactive hemp fiber. The reaction mixture was kept at room temperature for 1 hour. Afterward, 3 mL of 1 M aqueous NaOH solution was added to the reaction mixture. Then, the well-mixed mixture was added to a 1-inch diameter quartz tube and compressed with a wooden rod by hand. The filled tube was heated to 60-80° C. to create a cross-linked network of hemp fiber powder for 2 hours (Scheme 2). The as-formed cylindrical plug products were removed from the quartz tube and then was dried at 100° C. overnight. These plugs were soaked and rinsed in water repeatedly to remove salts produced in the reaction. The water-soaked plugs were dried in the air before studying their applications for hydroponic plant growth. Control samples were fabricated with "deactivated" reactive hemp fibers following a similar procedure for comparisons. In this case, the reactive hemp fibers were deactivated by reacting them with an aqueous NaOH solution (pH=8-9) at 60-80° C. for 2 hours to deprotect the vinyl sulfone group and convert it into an unreactive OH functional group (Scheme 3).

Characterization of Hemp Fiber Composites

Chemical Characterization

ATR-FTIR Characterization. The hemp fiber composite was characterized by attenuated total reflectance-Fourier transformed infrared (ATR-FTIR) spectroscopy using a Thermo Nicolet Avatar 380 FT-IR (ThermoFisher Scientific, Madison, WI) with a standard ATR configuration (diamond crystal) with a resolution of 0.4 $cm^{-1}$.

Measurement of salinity (EC), acidity (pH), and C/N ratio of the growth media. The measurements of substrate salinity (EC), acidity (pH), and carbon-to-nitrogen (C/N) ratio of the hemp fiber composites were performed by Ward Laboratories Inc. (Kearney, NE). To determine the electrical conductivity (EC) and acidity (pH), about 10 g of the hemp fiber composite sample was added to a 10 mL plastic bottle with 10 mL of distilled water. The bottle with the sample was shaken for 30 minutes, and then the suspension was filtered using filter paper. The filtrate was then collected. The pH of the filtrate was measured using dual pH electrodes. The EC of the filtrate was measured using an EC probe which was completely submerged so that the platinum electrode had no air bubbles left. The carbon-to-nitrogen (C/N) ratio of the hemp composite was evaluated using the dumas combustion technique. In this technique, a combustion analyzer (furnace at 1,350° C.) was used.

Physical Characterization of Hemp Fiber Composites

Measurement of bulk density and water holding capacity. The bulk density of a hemp fiber composite was determined by dividing the measured weight of each cylindrical sample by its calculated volume using its geometric measurements. The water holding capacity of the hemp fiber composite was measured as described elsewhere (Gessert et al. *Ornamentals Northwest,* 1(8): 11-12 (1976)). In each measurement, a cylindrical hemp fiber composite was immersed in 50 mL of deionized water in a beaker for 5 hours. Afterward, the wet composite was removed, and the volume of water drained was measured to yield the volume of water retained in the medium. The water holding capacity was calculated as the volume percentage of water retained by the saturated composite after it was allowed to drain using the formula below:

$$\text{Water holding capacity } \% = \frac{\text{Volume of water retained (mL)}}{50 \text{ mL}} \times 100\%$$

Mechanical compression study. The mechanical compression study of hemp fiber composite samples was performed on an MTS 810 Material Testing System, which has a load capacity of 25,000 N. The as-made composite samples were first mechanically milled into circular cylinders with flat ends. The diameters of these milled samples were about 21 mm to 22 mm. The length of these samples ranged from 21 mm to 35 mm. All compression tests to evaluate the load-bearing capabilities of the hemp fiber composite were carried out at a compression rate of 2 mm/minute. Load-time curves were computed from the measurements to obtain the compressive strength. Triplicates of hemp fiber composites were used to obtain the average values of compressive strengths of samples prepared using each described method.

$$\text{Compressive strength} = \frac{\text{Highest load (N)}}{\text{Cross-sectional area } (m^2)}$$

Plant Growth Parameters

Figure 5:
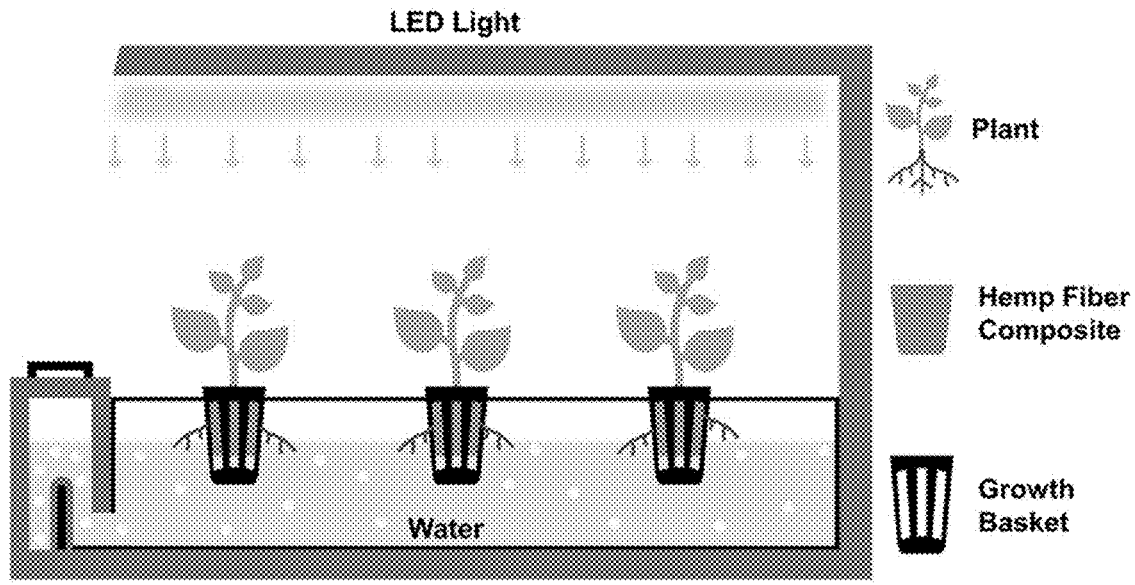
FIG. 5. Schematic showing the components of the hydroponic system used for studying plant growth with the hemp fiber composites.

The plant growth study was carried out using the "Sprout" hydroponic system from AeroGrow International, Inc (Boulder, CO). The system was equipped with a 10 W LED light and a bubbler to deliver oxygen to the water in the tank. Daikon radish (*Raphanus sativus* var. Longipinnatus) and green peas (*Pisum sativum*) were chosen as two plant models in our study. Only hemp fiber composites fabricated using an intermediate (3:10) weight ratio of the bifunctional linkers to hemp fibers were employed for the plant growth study. To prepare the hemp fiber composites, the seeds and the hemp fiber composites were sprayed with an aqueous solution of 3% hydrogen peroxide (Hyvee, Inc., Lincoln, NE) to minimize fungal growth. A 4-mm wide hole with 2-cm depth was drilled at the centered top of each cylindrical composite sample with a length of 4 cm. One plant seed was placed at the bottom of each composite hole. The tank of the hydroponic system was filled with deionized water to the recommended mark. 4 mL of liquid plant food solution (consisting of 4% nitrogen, 3% phosphate, 6% soluble potash, 1% calcium, and 0.5% magnesium) was added to the water tank. Afterward, the hemp fiber composites with the plant seeds were assembled with baskets (FIG. 5) and were put in the hydroponic system for the plant growth study. The light cycle for the hydroponic station was 16 hours of light and 8 hours of darkness. The growth rate of plants was analyzed by evaluating the number of leaves and the height of the plant measured from the top of the composite medium to the top of the plant during a 14-day growth period.

Results

Figure 6:
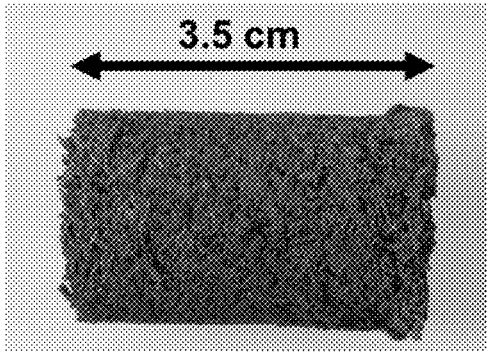
FIG. 6. Photograph of a hemp fiber composite plug fabricated using a 3:10 weight ratio of the bifunctional linkers to hemp fibers.

The as-produced cylindrical hemp fiber composites (or biocomposite plugs) were burgundy red, which indirectly revealed the degree of chemical linking of the bifunctional linkers to the lignin of the hemp fibers (FIG. 6). This color differentiated the fiber composite from the light brown hemp fibers before processing. The hemp fiber composites prepared with different weight ratios of bifunctional linkers to hemp fibers also displayed different shades of brown (FIG. 38). The hemp fiber composites fabricated with a lower weight ratio of bifunctional linkers to hemp fibers have lighter shades of brown, whereas those made with a high weight ratio are darker brown. Thus, a darker colored hemp fiber composite reflects a higher degree of functionalization of hemp fibers with the bifunctional linkers.

Figure 7:
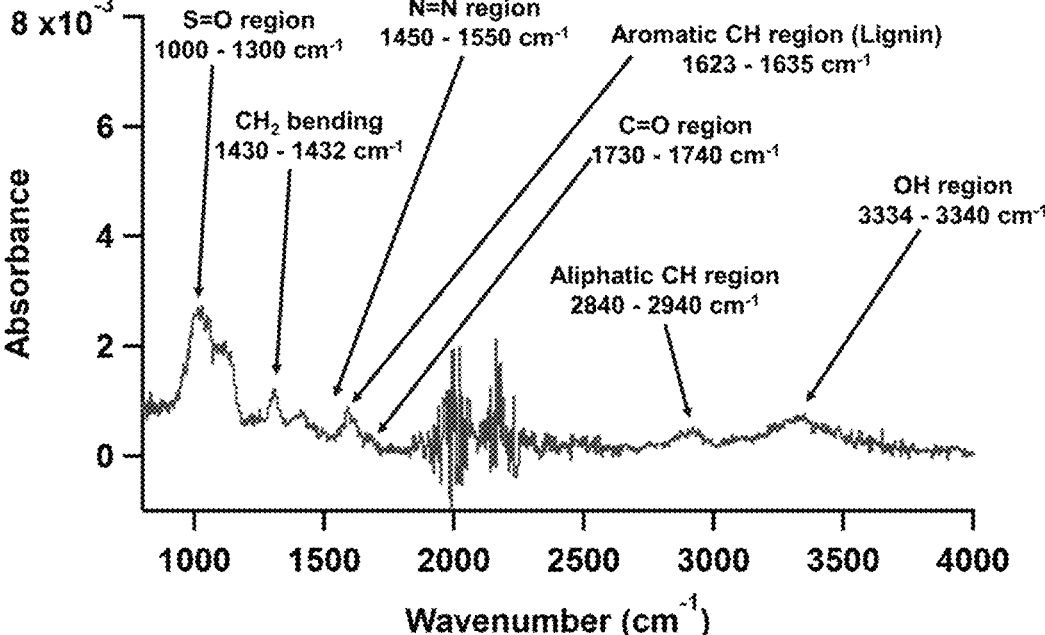
FIG. 7. ATR-FTIR spectrum of a hemp fiber composite fabricated with a 3:10 weight ratio of the bifunctional linkers to hemp fibers.

The chemical functionalities of the hemp fiber composites containing different polyol derivatives and phenolic species were characterized by ATR-FTIR spectroscopy. The FTIR data revealed the presence of the bifunctional linkers and the PVA in the hemp fiber composite materials. A typical FTIR spectrum of the composite consisted of a broad peak in the $3,334\text{-}3,340 \text{ cm}^{-1}$ region, which was attributed to the OH stretching arising from the polyol groups (FIG. 7). This broad feature also indicated the hydrogen bonding network arising from the amorphous celluloses. The presence of amorphous cellulose was denoted by the vibration band from 2,840 to 2,940 cm-1, which represented the aliphatic C—H stretching mode. The $1,730\text{-}1,740 \text{ cm}^{-1}$ region corresponded to the C—O stretch in non-conjugated ketones, carbonyls, and ester attached to the main skeletal structure of lignin. The absorption bands in the region of 1,623-1,635 $\text{cm}^{-1}$ were attributed to the C—H vibrations of the aromatic skeletal structure of lignin in the hemp fiber. In addition, the absorption band in the region of $1,430\text{-}1,432 \text{ cm}^{-1}$ was assigned to a symmetric $CH_2$-bending mode. The vibration band at the $1,000\text{-}1,300 \text{ cm}^{-1}$ region denoted the sulfone (S=O) group of the bifunctional linker attached to lignin.[34] Furthermore, the region around $1,450\text{-}1,550 \text{ cm}^{-1}$ corresponded to the azo (N=N) functional group of the bifunctional linker when attached to the hemp fiber (See Scheme 1).

Figure 10:
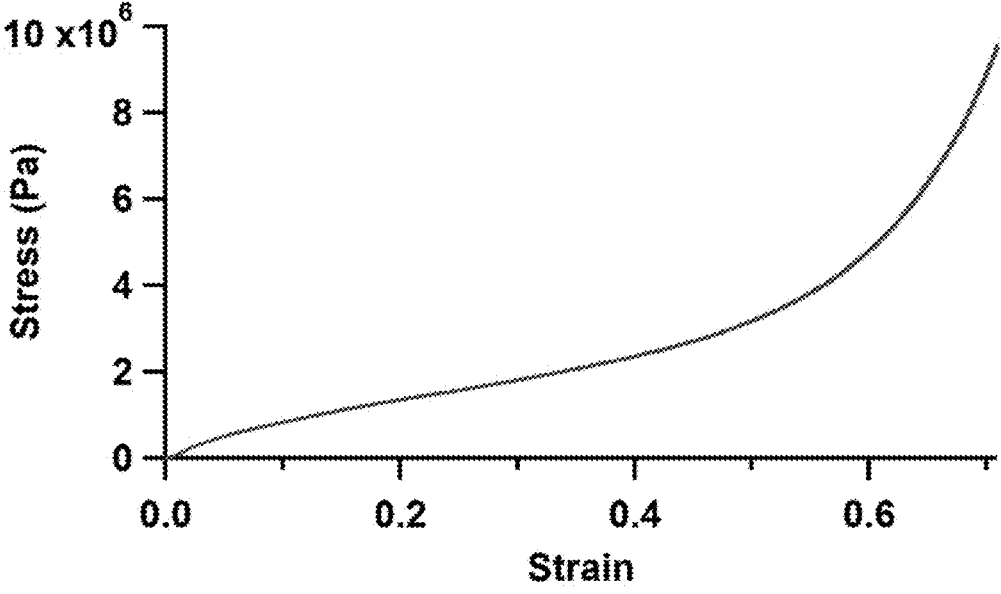
FIG. 10. Plot depicting the stress-strain curve of the mechanical compression study of a hemp fiber composite fabricated with a 3:10 weight ratio of bifunctional linkers to hemp fibers.

The compressive mechanical tests further confirmed the cross-linking of the hemp fibers into a composite material with good structural integrity. For example, the compressive stress vs. time curve illustrated a significant difference between the mechanical properties of the hemp fiber composite fabricated using a 3:10 weight ratio of bifunctional linkers to hemp fibers and the control sample (FIG. 8 and FIG. 10). The control sample was not cross-linked because it was prepared with "deactivated" reactive lignin hemp fibers. During the mechanical tests, while the cross-linked hemp fiber composite plug maintained its general shape during the initial compression, the control sample just crumbled with little resistance from the compression. Our data indicated that the cross-linking with PVA between the hemp fibers created a strong network. For instance, the compressive strength of the cross-linked biocomposites fabricated using a 3:10 weight ratio of bifunctional linkers to hemp fibers was measured to be approximately 1.64 MPa, which was approximately equivalent to a compressive load of ~500 N before the biocomposites collapsed.

The effect of the weight ratio of bifunctional linkers to hemp fibers used in the fabrication of reactive hemp fiber powders on the mechanical strength of resulting biocomposites was investigated. The compressive strength of these dry hemp composites was measured to increase from 0.91 MPa to 1.81 MPa when this weight ratio was raised from 3:40 to 3:5 (FIG. 38). This indirectly suggests that an increase in the number of bifunctional linkers used to functionalize the hemp fibers can increase the cross-linking between the fibers, leading to an increase in the compressive strengths of resulting biocomposites.

The investigation on the suitability of hemp fiber composites as a hydroponic growth medium focused on evaluating the properties and application of the composites fabricated with an intermediate weight ratio (3:10) of bifunctional linkers to hemp fibers for plant growth. Properties of these hemp fiber composites including water retention capacity, carbon/nitrogen ratio, salinity, and acidity were studied. The water holding capacity of composite material is an important physical parameter that denotes its porosity and water retention ability. The features of a biocomposite such as texture, porosity, packing structure, and the content of organic matter determine its ability to retain moisture. The water holding capacity of a substrate also indicates the suitability of the substrate as a hydroponic growth medium. Hemp fibers are hydrophilic in nature. They have a water holding capacity of 5-8% at room temperature. The water holding capacity of the hemp fiber composite fabricated with a 3:10 weight ratio of bifunctional linkers to hemp fibers was measured to be 13.4±1.7%. This increase in water holding capacity was attributed to the use of PVA in the fabrication process because the excess hydroxyl groups of the PVA facilitate the composite to absorb more water. Note that the water holding capacity of the hemp fiber composite was comparable to that of commercial peat moss composites (14.8±2.7%), suggesting its suitability as a growth medium (Table 1).

(pH) for the hemp composite fabricated using a 3:10 weight ratio of bifunctional linkers and hemp fibers was determined to be slightly basic (pH=7.8). This was possibly attributed to the leftover NaOH used in the cross-linking process. Depending on the type of plant, one can regulate the pH of the growth medium. For example, potassium hydroxide or bicarbonate of soda can be added to the growth media if the pH is too low. If a plant requires an acidic medium to grow, the pH can be lowered by adding phosphoric acid or acetic acid instead. The electrical conductivity of the hemp fiber composite fabricated with a 3:10 weight ratio of bifunctional linkers to hemp fibers was measured to be 0.42 mS·cm$^{-1}$, which lies in the desirable range for general purpose growth media (<than 2.0 mS·cm$^{-1}$).

The plant growth study with the hemp fiber composites fabricated with a 3:10 weight ratio of bifunctional linkers to hemp fibers demonstrated their suitability as promising hydroponic growth media. In the study, seeds of Daikon radish and green peas were individually planted in the holes of hemp fiber composite plugs. These plugs were assembled

TABLE 1

Chemical and physical properties of hemp fiber biocomposites and peat moss.

| Material | Electrical Conductivity (mS · cm$^{-1}$) | pH | Bulk Density (g/cm$^3$) | Water Holding Capacity % | Compressive Strength (GPa) |
|---|---|---|---|---|---|
| Hemp fiber composite | 0.42 | 7.8 | 0.313 | 13.4 ± 1.7 | 1.64 |
| Peat moss composite | 0.05 | 5.0 | 0.207 | 14.8 ± 2.7 | — |

The carbon-to-nitrogen (C/N) ratio of a biocomposite provides information about the nitrogen limitation/availability to the plants and microorganisms and thus the suitability of a composite material as a hydroponic growth medium. For instance, the decrease in the C/N ratio is a sign of fermentation and the performance of the composting process during the maintenance period. The primary energy source of microorganisms comes from the carbon content of the growth medium, while the nitrogen content of the growth medium is used by microorganisms for breaking down the organic matter. Microorganisms typically do not function well in a medium with a C/N ratio of 30 or above. If this ratio increases up to 30, the rate of compost breakdown will decrease. This ratio typically decreases in the composting process for a long period. As such, attention must be paid to the C/N ratio of the medium because excess nitrogen in the growth medium will be converted to $NH_4^+$ ion by microorganisms when the C/N ratio goes below 25. In this case, the C/N ratio of the hemp fiber composite fabricated with a 3:10 weight ratio of bifunctional linkers to hemp fibers was measured to be 37.3, which meets the general criteria for a good and healthy hydroponic growth medium.

Figure 9:
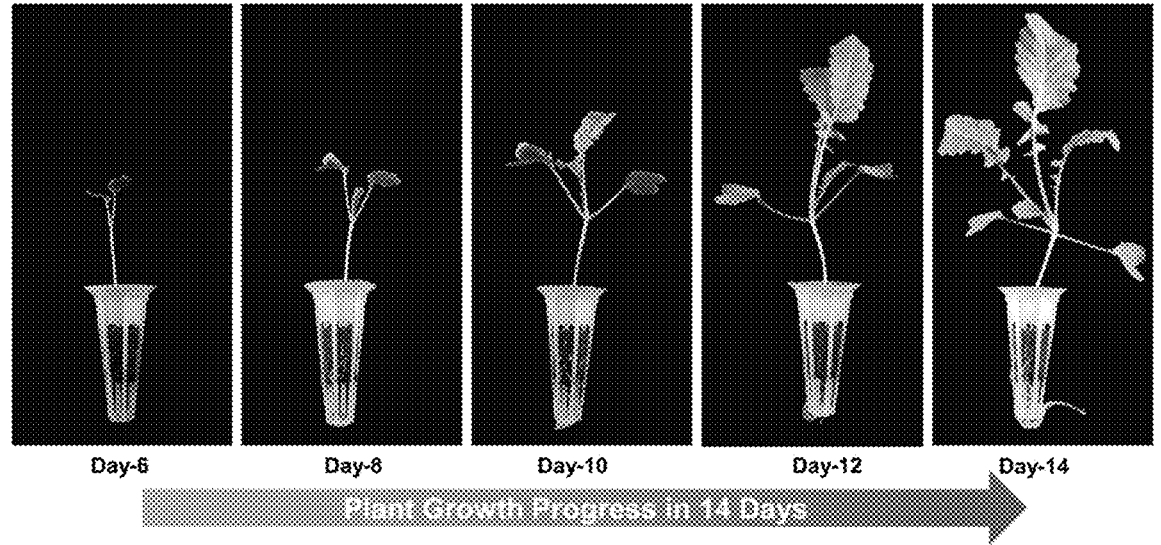
FIG. 9. Photos showing the hydroponic growth of a Daikon radish plant using a hemp fiber composite as the growth medium from Day-6 to Day-14.
Figure 11:
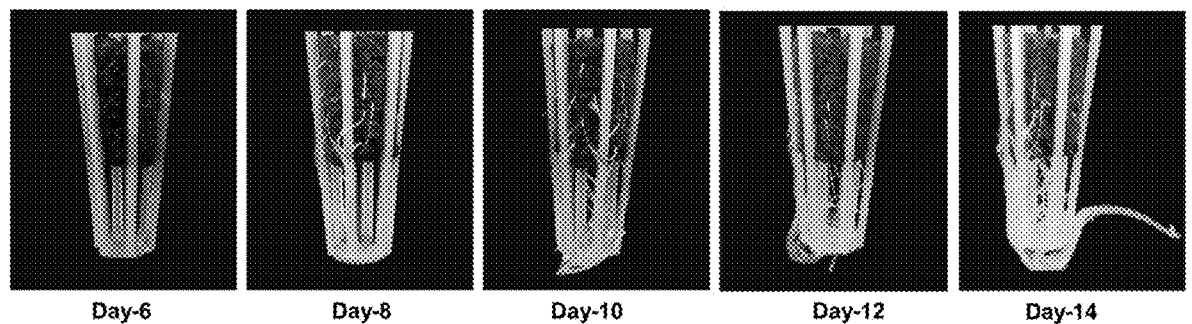
FIG. 11. Photos showing the root growth of a Daikon radish plant using a hemp fiber composite fabricated with a 3:10 weight ratio of bifunctional linkers to hemp fibers as a hydroponic growth medium.
Figure 12:
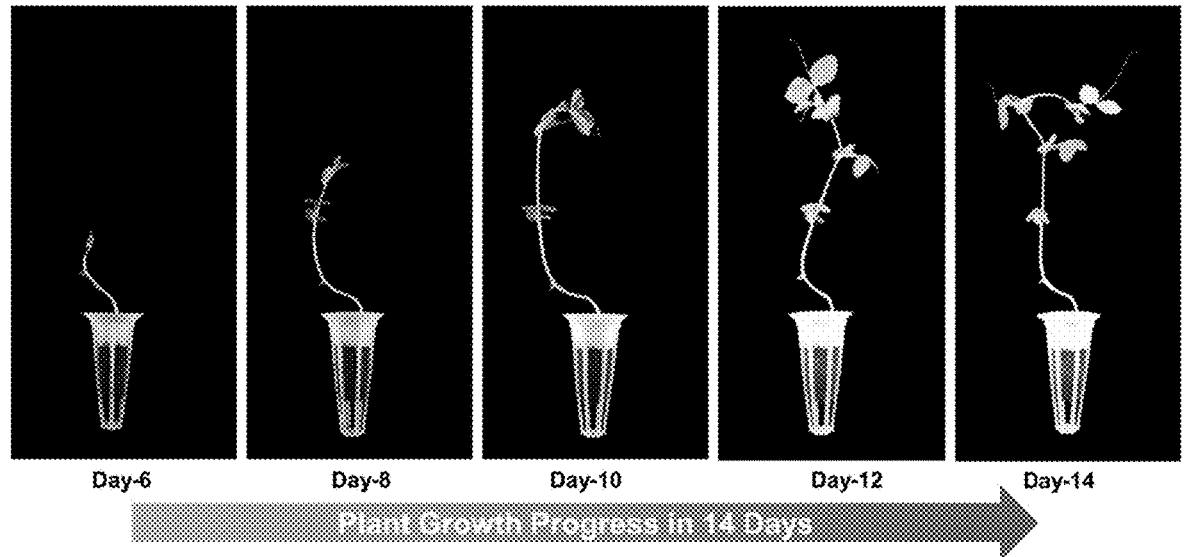
FIG. 12. Photos showing the hydroponic growth of a green pea (Pisum sativum) plant using a hemp fiber composite growth medium from Day-6 to Day-14.

Substrate acidity (pH) and salinity (or electrical conductivity (EC)) of a growth medium can greatly affect the delivery of nutrients and plant growth. The pH of a growth medium influences the nutrient availability to the plant. It can also control mineral deficiencies and toxicities towards certain plants/crops. The optimum pH ranges for growing plants hydroponically vary depending on the type of plants. However, based on previous studies, most plants prefer a pH range from 6 to 7 for the proper nutrition uptake. EC is an indirect measurement of the type of salts and the ability of the growth medium to carry an electrical charge. This information also indirectly implies the amount of nutrients accessible to the plants for absorption. The substrate acidity with plastic baskets and placed in the hydroponic growth systems. The growth of the plants germinated from these seeds was observed for 14 days (FIG. 9, FIG. 11, and FIG. 12). For both model plants, their seeds were geminated within the first few days of the study. The progress of the plant growth was monitored by counting the number of leaves and measuring the height of these plants (Table 2 and Table 4). Significant plant growth denoted by these parameters was observed beginning Day-5 to Day-6 of the growth study. For example, the true leave of the Daikon radish plant shown in FIG. 9 began to bud at the end of Day-6 of the growth. The root system of this radish plant was found to develop considerably during the 14 days of observation (FIG. 11). The number of leaves increased to 6, and the height of plant height increased to 18 cm at the end of Day-14 (Table 2). The average growth of the green pea plants was found to be faster than that of the Daikon radish plants in terms of the number of leaves and the plant height observed by the end of Day-14 (Table 2, FIG. 12, and Table 4).

TABLE 2

Table depicting growth parameters employed to study the hydroponic growth of a Daikon radish plant with the hemp fiber composite as the growth medium.

| Growth day | Number of leaves | Plant height (cm) |
|---|---|---|
| Day-6 | 2 | 8.5 |
| Day-8 | 3 | 9.8 |
| Day-10 | 4 | 13.0 |
| Day-12 | 5 | 16.9 |
| Day-14 | 6 | 18.1 |

TABLE 4

Table depicting growth parameters employed to study the hydroponic growth of a green pea plant with the hemp fiber composite fabricated with a 3:10 weight ratio of bifunctional linkers to hemp fibers as the growth medium.

| Growth day | Number of leaves | Plant height (cm) |
|---|---|---|
| Day-6 | 3 | 7.5 |
| Day-8 | 10 | 11.4 |
| Day-10 | 13 | 15.8 |
| Day-12 | 16 | 19.0 |
| Day-14 | 21 | 20.1 |

In summary, this study demonstrated a water-based chemical approach to fabricate hemp fiber composites to produce durable composite materials as plant growth media for applications in hydroponics. This chemical approach illustrates a novel upcycling strategy for waste hemp fibers by activating lignin within hemp materials to fabricate hemp fiber biocomposites. These hemp fiber composites had good mechanical compressive strength and higher C/N ratios which are major criteria for a good hydroponic growth media. T synergistic green approach using polyvinyl alcohol as the bridging cross-linker increased the water holding capacity of the fiber composite (e.g. 13.4±1.7% for hemp composites fabricated with a 3:10 weight ratio of bifunctional linkers to hemp fibers) from those of pure hemp fibers (5%-8%) and enhanced the structural integrity of the biocomposite. These two improvements elevated the hemp fiber composite materials as better and sustainable hydroponic growth media. This eco-friendly water-based chemical approach is generalizable and applicable to creating different multifunctional biocomposite materials from renewable bio-materials with high lignin content such as natural fibers including flax, jute, sisal, coco coir, coconut husk, and kenaf.

Together these results demonstrate that a water-based chemical approach can be used to make durable, solid slurry was under constant stirring. The slurry was stirred for an additional 30 minutes. 30 g of coco coir was then added to the slurry. Water (150-200 mL) was added as needed to the reaction mixture to aid in stirring. Stirring became easier as the reaction proceeded. The reaction mixture was stirred for an additional 8 hours while maintaining the pH at 4 to 5 through the addition of $NaHCO_3$ at room temperature. The color of the reaction mixture changed from a pale brown color to deep burgundy red, indicating the formation of the diazo bond. The final reactive coco coir was transferred to a tray and was dried in an oven at 100° C. overnight to yield a burgundy powder product.

16 g of 8 wt. % polyvinyl alcohol (PVA) aqueous solution was mixed with 4 g of the burgundy reactive coco coir. The reaction mixture was kept at room temperature for 1 hour. Afterward, 3 mL of 1 M aqueous NaOH solution was added to the reaction mixture. Then, the well-mixed mixture was added to a 1-inch diameter quartz tube and compressed with a wooden rod by hand. The filled tube was heated to 60-80° C. to create a cross-linked network of coco coir for 2 hours. The as-formed cylindrical plug products were removed from the quartz tube and then was dried at 100° C. overnight. These plugs were soaked and rinsed in water repeatedly to remove salts produced in the reaction. The water-soaked plugs were dried in the air before studying their applications for hydroponic plant growth.

Results

Figure 13:
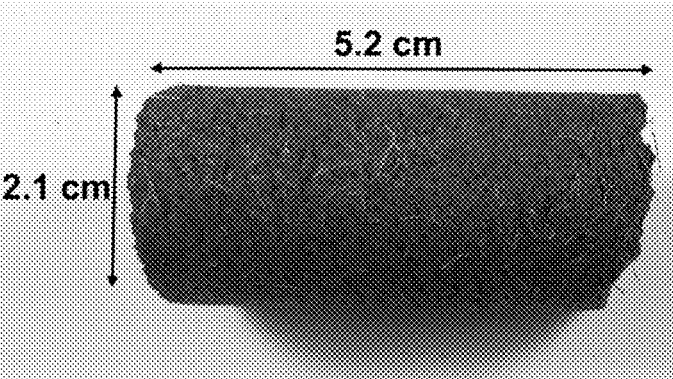
FIG. 13. Photo showing a representative coco coir biocomposite.

A photograph of a representative plug is shown in FIG. 13.

Figure 14:
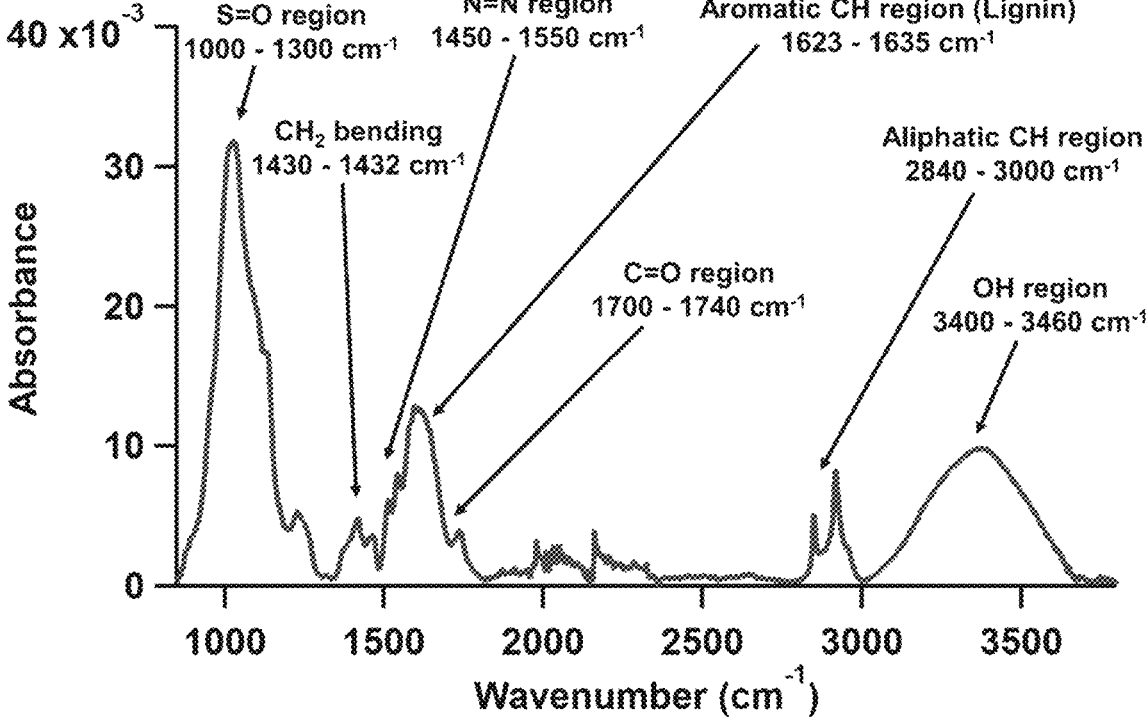
FIG. 14. ATR-FTIR spectra of the coco coir biocomposites.

ATR-FTIR spectra of the coco coir biocomposites is shown in FIG. 14.

Figure 15:
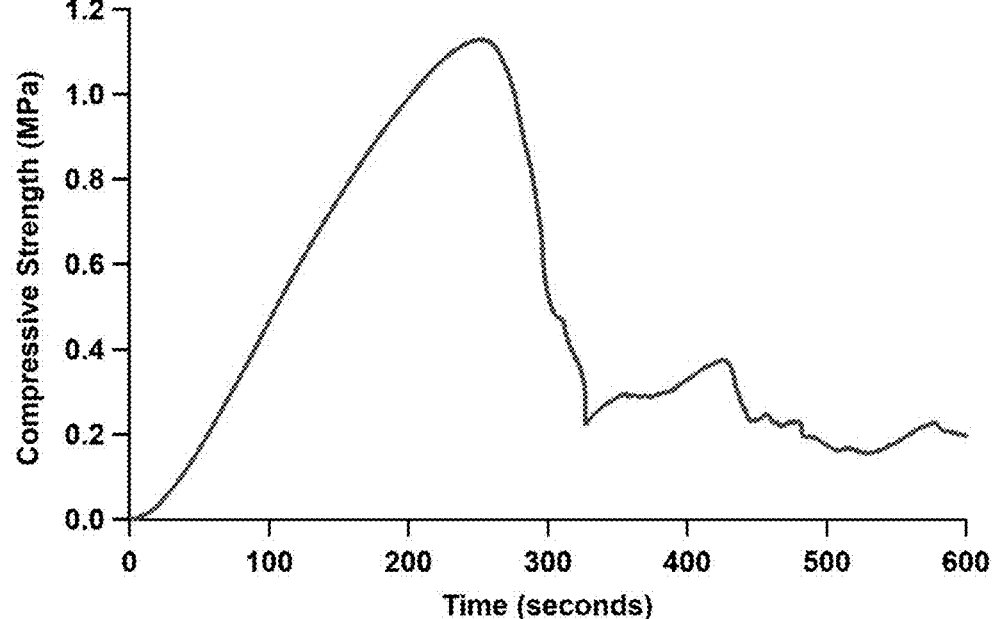
FIG. 15. Plot showing the mechanical behavior a cylindrical coco coir composite under a compression rate of 2 mm/minute.

Plot showing the mechanical behavior a cylindrical coco coir composite under a compression rate of 2 mm/minute is shown in FIG. 15.

TABLE 5

Chemical and physical properties of coco coir composites.

| Material | Electrical conductivity (mS · cm$^{-1}$) | pH | Carbon-to-nitrogen ratio | Bulk density (g/cm$^3$) | Water holding capacity % | Compressive strength (MPa) |
|---|---|---|---|---|---|---|
| Coco Coir composite | 1.07 | 7.6 | 32.3 | 0.34 | 17.79 ± 2.39 | 1.13 ± 0.04 | material hemp fiber composites. These results also demonstrate that such hemp fiber composites can be used as plant growth media for hydroponics.

Example 2: Coco Coir Biocomposites Fabricated Using a Green Chemical Pathway This Example describes using a green chemical approach for valorization of coco coir for making biocomposites.

Methods:

1. A slurry of 2-[(4-aminophenyl)sulfonyl]ethyl hydrogen sulfate (9 g, 0.032 moles) was first obtained by adding 100 mL of tap water and 100 g of ice to the chemical in a 1-L beaker, followed by 30 minutes of stirring. Afterward, a 30 mL of 10% $H_2SO_4$ aqueous solution was added to the slurry and the mixture was stirred for 5 minutes. An aqueous solution containing 20% $NaNO_2$ (2.35 g, 0.034 moles) was added dropwise subsurface of the slurry over 10 minutes while the

Example 3: Valorization of Coco Coir into Biocomposite Materials Through Water-Based Chemistry The results in this Example re-present and expand on at least some of the results provided in other Examples.

Figure 16:
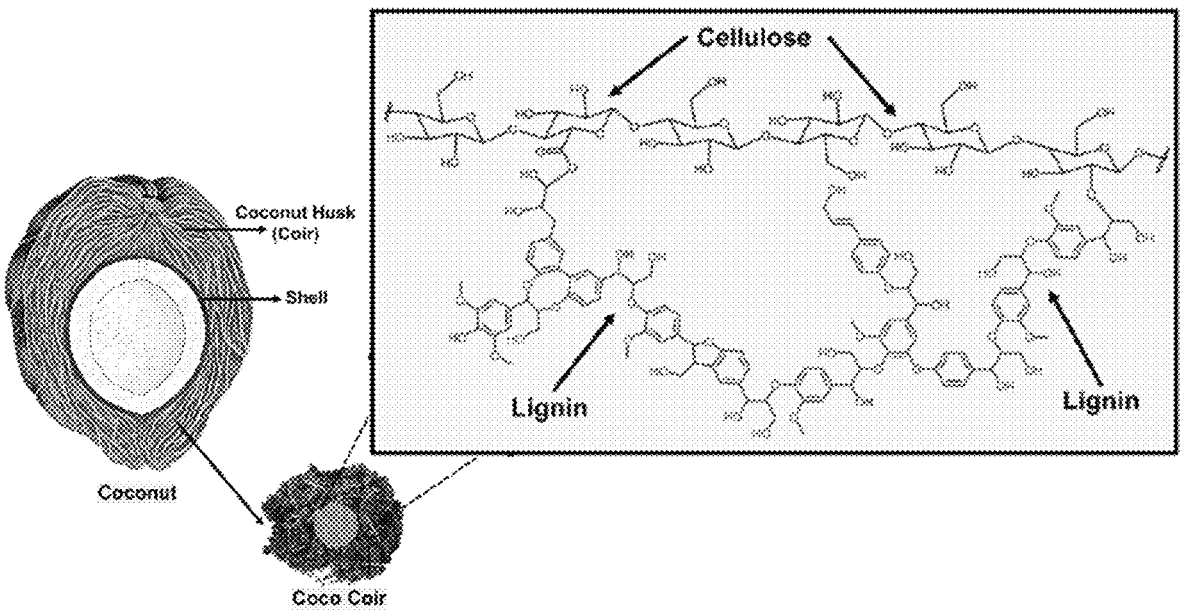
FIG. 16. Schematic showing different components of a ripened coconut. Inset showing the polymeric structure of cellulose and lignin within coco coir.
Figure 17:
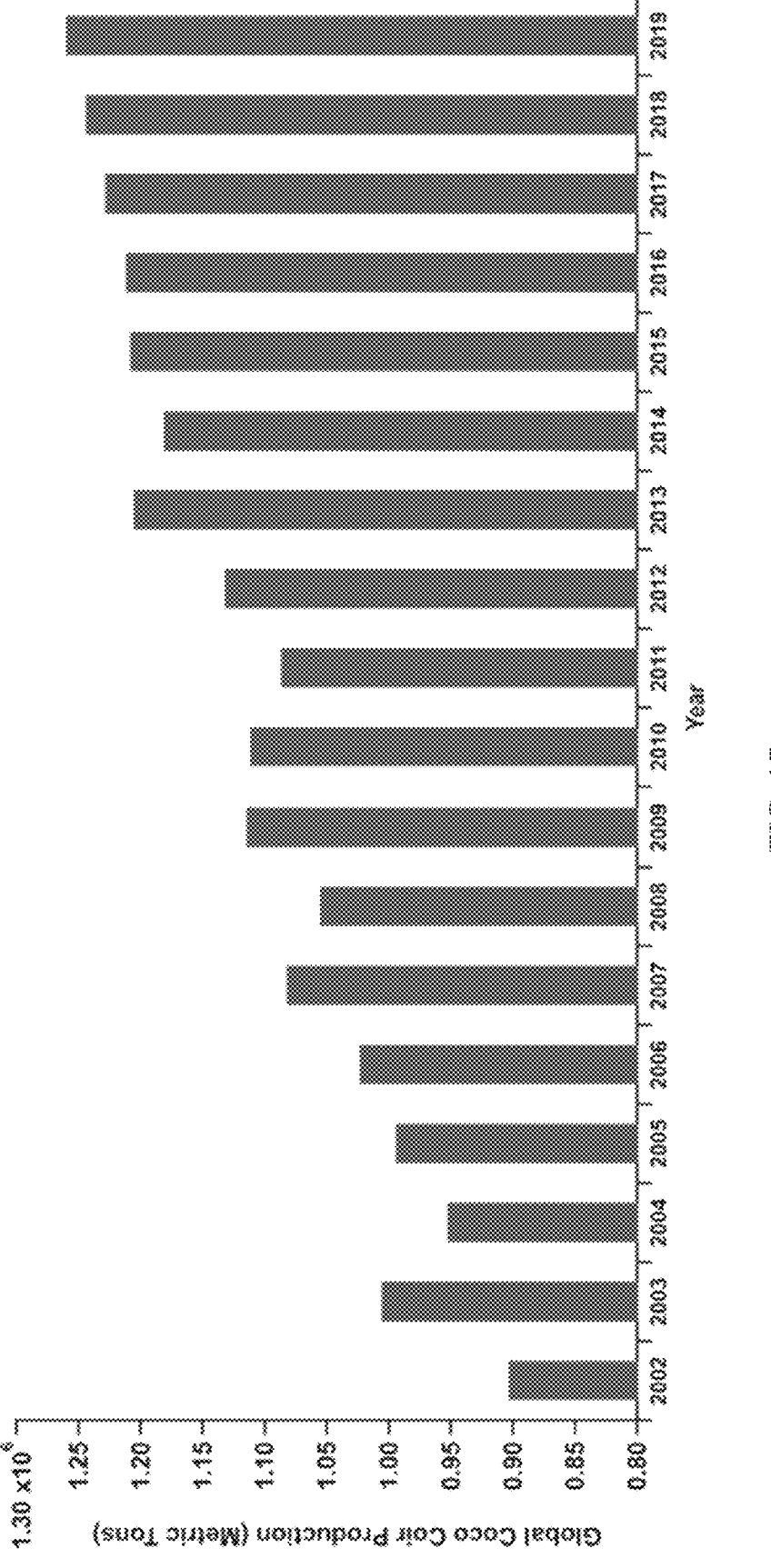
FIG. 17. Annual worldwide production of coco coir reported by the Food and Agriculture Organization of the United Nations (FAO).

Coconut coir (also referred to as coco coir or coco fibers) is a fibrous material from the outer husk of coconuts (*Cocos nucifera* L.). See, e.g., FIG. 16.

Materials and Methods

Materials

Coco coir was bought from Urban Worm Company (Plymouth Meeting, PA). 2-[(4-Aminophenyl)sulfonyl]ethyl hydrogen sulfate was used as the bifunctional linker and was bought from Alfa Chemistry (Ronkonkoma, NY). Polyvinyl alcohol (PVA) with a molecular weight of 10,000 Da was obtained from MilliporeSigma (St. Louis, MO). Sodium nitrite ($NaNO_2$), sodium hydroxide pellets (NaOH), sodium bicarbonate ($NaHCO_3$), and concentrated sulfuric acid ($H_2SO_4$) were bought from VWR International (Radnor, PA). All chemicals were used as purchased. Nanopure water of 18.2 MΩ cm resistivity was obtained from a Synergy water purification system (VWR, Radnor, PA), and tap water was sourced from the city water supply.

The "Farm 12" recirculating hydroponic growth system (AeroGrow Inc., Boulder, CO) was utilized to conduct the plant growth studies. The hydroponic system came with plant growth baskets and the liquid plant nutrient solution (AeroGarden Liquid Nutrient). The hydroponic system had a 60 W full spectrum grow light and pump to recirculate water from the reservoir to the growth media.

Synthesis of Reactive Coco Coir

A modified fabrication procedure was used to functionalize coco coir with reactive chemical groups (Scheme 4). The activation of coco coir was carried out with four mass ratios of bifunctional linkers to coco coir (1:10, 3:10, 7:10, and 10:10) to examine the relationship between the mass ratio of reactant to coco coir and the physical traits such as bulk density and mechanical compressive strength of the coco coir composites. For instance, for synthesizing reactive coco coir using a 3:10 mass ratio of 2-[(4-aminophenyl) sulfonyl]ethyl hydrogen sulfate (bifunctional linker molecule) to coco coir, a mixture of the bifunctional linkers was initially made by combining 9 g of the bifunctional linker with 100 g of ice and 100 mL of water in a 1-L glass beaker. After stirring the mixture for 30 minutes, 30 mL of 10% $H_2SO_4$ was added slowly to the reaction mixture. The resulting slurry was then stirred for another 5 minutes. To convert the bifunctional linkers into diazonium salts, an aqueous solution containing 2.35 g of 20% $NaNO_2$ was gently added to the subsurface of the slurry for 10 minutes (Step 1 in Scheme 4). The slurry was stirred throughout this addition process and then for an additional 30 minutes. Afterward, $NaHCO_3$ was added to the slurry of activated bifunctional linkers until the pH of the slurry was between 4 and 5. To produce the reactive coco coir, 30 g of coco coir were first ground into a powder with mortar and pestle. Then, the ground-up coco coir and water were mixed with the slurry. The pH of the mixture was maintained between 4 and 5 by adding $NaHCO_3$ with stirring (Step 2 of Scheme 4). The slurry was stirred for 8 additional hours before being transferred to a Pyrex® crystallizing dish and dried overnight at 100° C.

Interfacial Matrix Bonding of Reactive Coco Coir with Polyvinyl Alcohol

The improved fabrication process of coco coir composites with different mass ratios of bifunctional linkers to coco coir (1:10, 3:10, 7:10, and 10:10) were carried out using different mass ratios of PVA to reactive coco coir (0.1:5, 1:5, 2:5, and 4:5) (Scheme 5). For example, to fabricate a coco coir composite with a 3:10 mass ratio of bifunctional linkers to coco coir and a 2:5 mass ratio of PVA to reactive coco coir, 4 g of the corresponding reactive coco coir was mixed with 16 g of a 10 wt % PVA (MW=10 kDa) aqueous solution. The mixture was blended into a paste and was left at room temperature for 30 minutes. 3 mL of a 20% NaOH solution were then slowly added to the paste to create a uniform mixture. The base was used to remove the sulfonate of the bifunctional linkers to yield the vinylsulfone groups and activate the reactive coco coir for crosslinking with PVA. This paste was compressed into a 4-inch-long quartz tube with a 1-inch diameter using a cylindrical wooden stick. During this process, most of the excess water and air present in the paste were removed. After the compression, the composite was removed from the tube and placed on a crystallizing dish. The dish with the sample was degassed under vacuum using a diaphragm vacuum pump (Laboport®, KNF Neuberger, Inc., Trenton, NJ) for 10 minutes to remove excess air bubbles within the sample. The resulting materials were again packed into a quartz tube (1-inch diameter) mold with a cylindrical plunger. The filled tube was carefully placed inside an oven at 70° C. for 3 hours. Afterward, the cylindrical coco coir composite was removed from the quartz tube assembly and placed on an aluminum foil to dry overnight in a convection oven at 100° C. The degassing step minimized the formation of gas pockets which could lead to the fracturing of composite materials, enhancing the uniformity of the products. In particular, it allowed us to fabricate coco coir composites using high concentrations of PVA with high consistency.

Characterization of Coco Coir Composites

Characterization of chemical composition. ATR-FTIR spectroscopy was applied to study different chemical functional groups present within PVA, unreacted coco coir, and as-fabricated coco coir composite samples with a Thermo Nicolet Avatar 380 FTIR (Thermo Fisher Scientific, Madison, WI). The fabricated coco coir composite samples were further tested by Ward Laboratories Inc. (Kearney, NE) for evaluating their carbon-to-nitrogen ratio (C/N), substrate acidity (pH), and electrical conductivity. The measure of electrical conductivity indirectly reflects the measure of substrate salinity because dissolved ions from salts in water increase both the conductivity and salinity of the water simultaneously. To measure the electrical conductivity (EC) and the substrate acidity (pH), 10 g of coco coir biocomposite sample was placed in a 10 ml bottle containing 10 mL of deionized water. The resulting suspension was then stirred for 30 minutes. Afterward, the mixture was filtered out, and the filtrate was analyzed. Dual pH electrodes were used to measure the pH of the filtrate. A conventional platinum EC probe was used to measure the EC of the filtrate. Additionally, the Dumas combustion method was employed to determine the carbon-to-nitrogen ratio (C/N) of the coco coir biocomposite samples with a combustion furnace analyzer operated at 1350° C.

Water retention capacity and bulk density measurement. The coco coir biocomposite sample's bulk density was numerically evaluated by dividing the mass of each coco coir composite sample by its volume computed using its measured physical dimensions. The water retention capacity of the coco coir composites was estimated. First, a coco coir composite sample was submerged in water (50 mL) in a glass beaker for 6 hours. Subsequently, the water-saturated composite was separated, and the water retained in the medium was found by draining the sample and measuring the volume of water drained. The water retention capacity is defined as the volume percentage of water absorbed by the water-soaked coco coir biocomposite after drainage.

Mechanical compression study. The MTS 810 Material Testing System was applied to measure the mechanical compressive strength of the coco coir composite samples. First, the coco coir composite samples were mechanically milled to yield flat-ended cylindrical-shaped coco coir composite samples. These samples varied in length that ranged from 34 mm to 45 mm. These milled coco coir composite cylindrical samples had diameters of around 20-21 mm. All mechanical compression studies for the coco coir composites were performed with a compression rate of 2 mm/minute for about 10 minutes to measure their load-bearing capabilities. The compressive strength was obtained from the measured computing load-time curves and evaluated by dividing the highest load with the cross-sectional area of the cylindrical coco coir composite sample. The mean values of the mechanical compressive strengths of the coco coir composite samples were obtained through studying three specimens for each described fabrication method.

Two-Factor Study of the Influence of Reactant Ratios on the Bulk Density and Mechanical Compression Strength of Coco Coir Composites The relative amounts of bifunctional linkers, PVA, and coco coir used in the fabrication of coco coir composites can significantly influence the degree of crosslinking within the biocomposites and hence their resulting physical and chemical properties. A two-factor study was conducted to evaluate the influence of the mass ratio of bifunctional linkers to coco coir and the mass ratio of PVA to reactive coco coir used in the fabrication on the bulk density and the mechanical compressive strength of the resulting biocomposites. Four different batches of reactive coco coir were made with four different mass ratios of the bifunctional linkers to coco coir (1:10, 3:10, 7:10, and 10:10). Each batch was applied to fabricate biocomposites with four different mass ratios of PVA to reactive coco coir (0.1:5, 1:5, 2:5, and 4:5). The mass of PVA was varied by adding corresponding different masses of a 10 wt % PVA solution to the reactive coco coir. In total, sixteen varieties of composites with different mass ratios of bifunctional linkers and PVA relative to coco coir were fabricated. Triplicates of these samples were produced to determine the statistical variations of their properties. Note that the bulk density of these biocomposites was found to significantly depend on the relative amounts of bifunctional linkers used in the reactions. This factor could change the bulk density of the as-fabricated samples by up to four times in our two-factor study. Thus, the total amounts of reactants were proportionally scaled up to provide sufficient materials for producing the cylindrical biocomposite samples, which are ca. 20-21 mm in diameter and 35-45 mm in length. The bulk density and the compressive strength of the fabricated samples were measured to elucidate the relationships of these properties to the ratios of reactants.

The two-factor (or two-way) statistical analysis of variance (ANOVA) with replication was applied to quantitatively evaluate the main and interaction effects of the two mass ratios of reactants (input variables) on the bulk density and the mechanical compressive strength of the coco coir composites (response variables). The ANOVA was performed with a significance level (a) of 0.05 (95% confidence interval) by using the built-in data analysis function in Microsoft Excel. Since the bulk density and the mechanical compressive strength of each triplicate of samples made using the 16 different reactants ratios were measured, the replication of three was used for the ANOVA analysis.

Plant Growth Study

Figure 18:
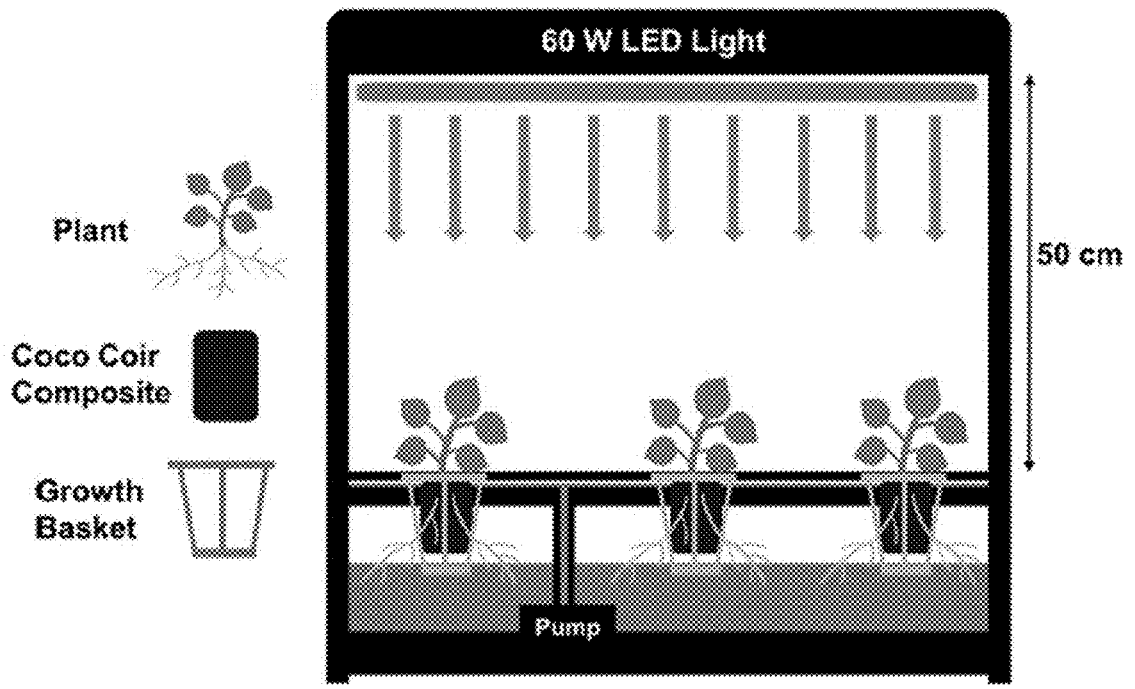
FIG. 18. Schematic depicting the "Farm 12" hydroponic growth system for the plant growth study using the coco coir biocomposites as the growth media.

The "Farm 12" hydroponic growth system (AeroGrow International, Inc (Boulder, CO)) was utilized to conduct the plant growth study (FIG. 18). The hydroponic growth setup included a 60 W LED panel and a water pump. The pump aided the recirculation of water from the reservoir to the growth media. Kale (*Brassica oleracea*) and cherry tomato (*Solanum lycopersicum*) were selected as the plant systems in our study to test the versatility of the biocomposite as a growth medium. Kale prefers a close-to-neutral pH ($6.5 < pH < 7.5$) medium to grow, whereas cherry tomato prefers an acidic ($5.5 < pH < 6.5$) medium instead. The coco coir composites synthesized with the 3:10 mass ratio of the bifunctional linkers to coco coir along with a 2:5 mass ratio of PVA to reactive coco coir were used for the plant study. The water reservoir of the "Farm 12" system was first filled with pure water, and then 4 mL of a liquid nutrient stock solution was added to the water reservoir. The additions of water and nutrient stock solution were repeated every two weeks during the growing period. This liquid nutrient stock solution consisted of 0.5% magnesium, 6% soluble potash, 4% nitrogen, 1% calcium, and 3% phosphate that are essential for plant growth. A hole (2 cm deep and 4 mm wide) was bored at the top of the cylinder-shaped coco coir biocomposite. Before the growth, the seeds and the coco coir composite samples were sprayed with 3% $H_2O_2$ solution (Hyvee, Inc., Lincoln, NE) for disinfection. One plant seed was gently placed inside the hole of each coco coir biocomposite. Afterward, these coco coir composite samples with the seeds were inserted in the growth baskets which were then put inside the hydroponic growth system (FIG. 18). Both model plants were exposed to light for 15 hours and then to darkness for 9 hours daily during the 31-day plant growth study. The height and the total number of leaves of each plant were recorded to evaluate the progress of plant growth.

Results

Figure 19:
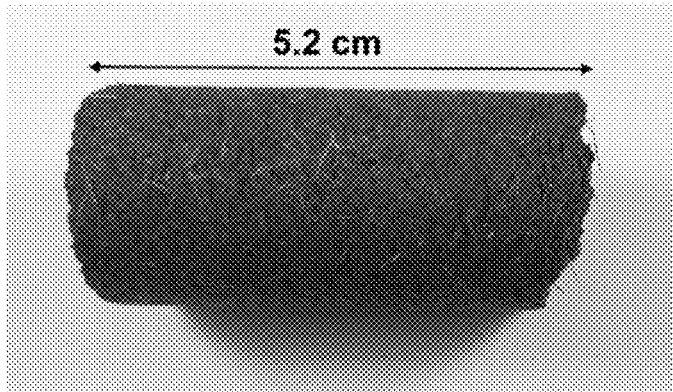
FIG. 19. Photograph of a coco coir composite synthesized with a 3:10 mass ratio of the bifunctional linkers to coco coir along with a 2:5 mass ratio of PVA to reactive coco coir.
Figures 24A, 24B, 24C, 24D:
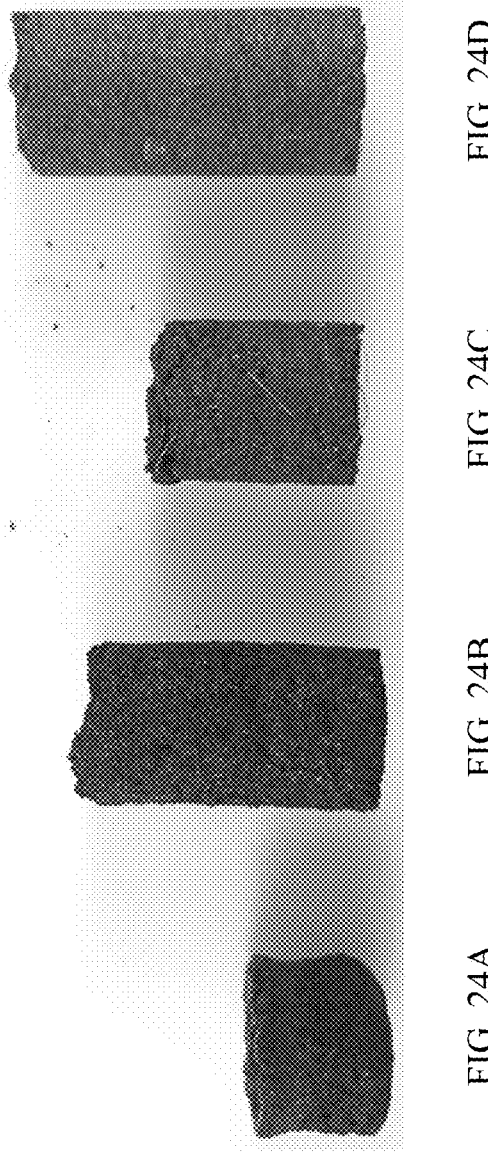
FIGS. 24A-24D. Photo depicting coco coir composites made using 10:10 (FIG. 24A), 7:10 (FIG. 24B), 3:10 (FIG. 24C), and 1:10 (FIG. 24D) mass ratios of the bifunctional linkers to coco coir and a 2:5 mass ratio of PVA to reactive coco coir in the fabrication process.

Through the water-based fabrication process, the as-fabricated coco coir composites were typically dark brown and firm. Their lengths were between 3 cm and 5 cm and their diameters were ca. 2 cm (FIG. 19). The color of the coco coir composites darkened as the mass ratio of the bifunctional linkers to coco coir increased (FIG. 24). As diazonium salts had dark pigmentation, this increase in the darkening of composites indicated that the diazonium group of the bifunctional linkers was successfully bonded to lignin present within coco coir. The degassing step in our modified fabrication process played a vital role in improving the overall consistency of the final products. The as-fabricated composites were more uniform in color and firmness by visual inspection.

Figures 20A, 20B:
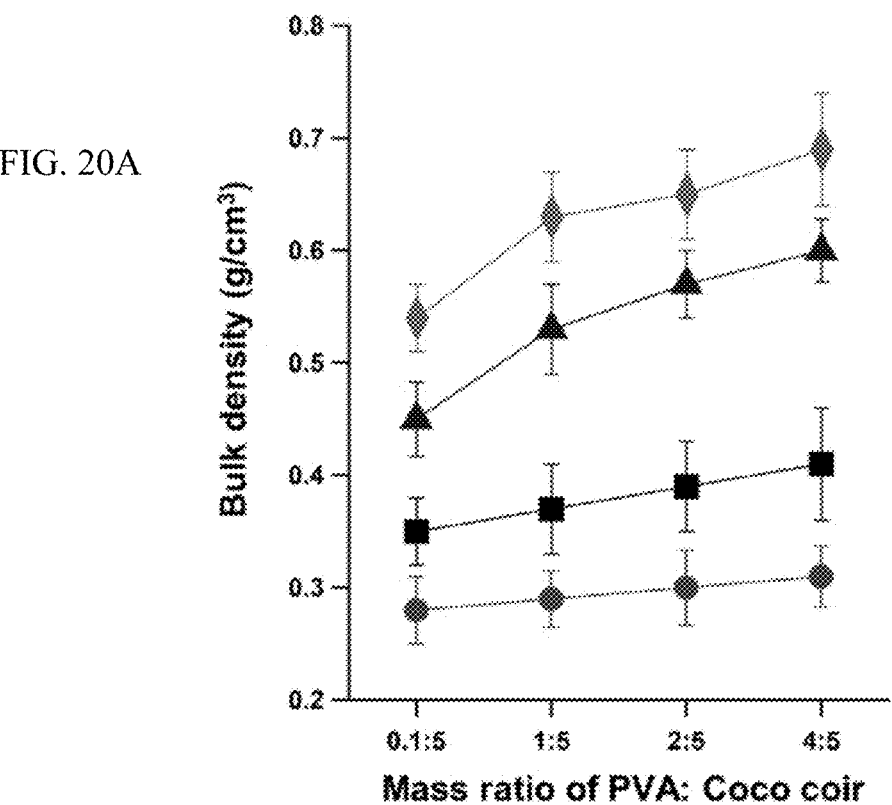
FIGS. 20A-20B. Marginal mean plots of bulk density (FIG. 20A) and mechanical compressive strength (FIG. 20B) of the coco coir composites with input variables (mass ratios of reactants to coco coir). The solid circles, squares, triangles, and diamonds in graphs represent the 1:10, 3:10, 7:10, and 10:10 mass ratios of the bifunctional linkers to coco coir, respectively. The standard deviations of these data are listed in Table 7.

The two-factor study illustrated the effects of the mass ratios of reactants to coco coir used in the fabrication process on the bulk density of the fabricated coco coir composites (FIG. 20A and Table 6). The two-factor AVOVA revealed that there was not a statistically significant interaction between the effects of the mass ratio of bifunctional linkers to coco coir and the mass ratio of PVA to reactive coco coir on the bulk density of coco coir composites ($F(9, 32)=1.796$, $p=0.108$) (Table 8). However, simple main effects analysis showed that both mass ratios of reactants to coco coir have a significant effect on the bulk density of the coco coir composites ($p<0.001$) (FIG. 20A and Table 8). For example, at fixed mass ratios of PVA to reactive coco coir, as the mass ratio of the bifunctional linkers to coco coir increased from 1:10 to 10:10, the bulk density of the coco coir composites increased from 93% to 123% or up to ca. 1.2-fold increment (FIG. 20A and Table 6). However, at fixed mass ratios of the bifunctional linkers to coco coir, as the mass ratio of PVA to reactive coco coir increased from 0.1:5 to 4:5, the bulk density of the resulting coco coir composites showed increases only from 11% up to 33%. These two trends and the range of bulk density values (0.28-0.69 g/cm³) indicated that the coco coir composites could be packed more densely by increasing either the density of reactive functional groups on the coco coir (relative amount of bifunctional linkers) or the crosslinkers (relative amount of PVA) in the fabrication process.

Similarly, the two-factor study also showed the effects of the mass ratios of reactants to coco coir used in the fabrication process on the mechanical compressive strength of the fabricated coco coir composites (FIG. 20B and Table 7). The two-factor AVOVA revealed that there was a statistically significant interaction between the effects of the mass ratio of bifunctional linkers to coco coir and the mass ratio of PVA to reactive coco coir on the mechanical compressive strength of coco coir composites ($F (9, 32)=13.404$, $p<0.001$) (Table 9). In addition, simple main effects analysis showed that both mass ratios of reactants to coco coir also have a significant effect on the mechanical compressive strength of the coco coir composites ($p<0.001$) (FIG. 20B and Table 9). For instance, at fixed mass ratios of the bifunctional linkers to coco coir, as the mass ratio of PVA to reactive coco coir increased from 0.1:5-4:5, the compressive strength of the coco coir composites increased from 243% up to 1017% or ca. 10-fold increment (FIG. 20B and Table 7). However, at fixed mass ratios of PVA to reactive coco coir, as the mass ratio of the bifunctional linkers to coco coir increased from 1:10-10:10, the increase in the compressive strength of composites was only from 67% up to 483%. For both trends, the percentage increase in the compressive strength was highest for the samples with the lowest mass ratios of reactants to coco coir (from 0.12 to 2.4 MPa). This confirmed that boosting the number of reactive sites on coco coir (i.e., relative amount of bifunctional linkers used in the fabrication) and the concentration of PVA could improve the degree of crosslinking and thus interfacial matrix bonding between coco coir in the sample space. The effect of an increase in the concentration of PVA on the compressive strength was observed to be more significant probably because the PVA provided more reactive sites per unit weight to increase the degree of crosslinking between the coco coir fibers.

TABLE 6

Bulk density of coco coir composites fabricated using different mass ratios of reactants.

| Mass ratio of PVA to reactive coco coir | Bulk density (g/cm$^2$) Mass ratio of bifunctional linkers to coco coir | | | |
|---|---|---|---|---|
| | 1:10 | 3:10 | 7:10 | 10:10 |
| 0.1:5 | 0.28 ± 0.03 | 0.35 ± 0.03 | 0.45 ± 0.03 | 0.54 ± 0.03 |
| 1:5 | 0.29 ± 0.02 | 0.37 ± 0.04 | 0.53 ± 0.04 | 0.63 ± 0.04 |
| 3:5 | 0.30 ± 0.03 | 0 39 ± 0.04 | 0.57 ± 0.03 | 0.65 ± 0.04 |
| 4:5 | 0.31 ± 0.02 | 0.41 ± 0.05 | 0.60 ± 0.02 | 0.69 ± 0.05 |

TABLE 7

Compressive strength of coco coir composites fabricated using different mass ratios of reactants.

| Mass ratio of PVA to reactive coco coir | Compressive strength (MPa) Mass ratio of bifunctional linkers to coco coir | | | |
|---|---|---|---|---|
| | 1:10 | 3:10 | 7:10 | 10:10 |
| 0.1:5 | 0.12 ± 0.02 | 0.25 ± 0.03 | 0.51 ± 0.03 | 0.70 ± 0.04 |
| 1:5 | 0.81 ± 0.03 | 0.96 ± 0.06 | 1.15 ± 0.04 | 1.35 ± 0.05 |
| 2:5 | 0,95 ± 0.07 | 1.13 ± 0.04 | 1.51 ± 0.08 | 1.90 ± 0.09 |
| 4:5 | 1.34 ± 0.08 | 179 ± 0.06 | 2.15 ± 0.06 | 2.40 ± 0.08 |

TABLE 8

ANOVA results depicting the main and interaction effects of different mass ratios of reactants on the bulk density of the as-fabricated coco coir composite.

ANOVA results for bulk density

| Source of variation | SS | df | MS | F | P-value | F crit |
|---|---|---|---|---|---|---|
| Mass ratio of PVA to reactive coco coir | 0.06195 | 3 | 0.02065 | 16.85714 | $9.53 \times 10^{-7}$ | 2.90112 |
| Mass ratio of bifunctional linkers to coco coir | 0.81225 | 3 | 0.27075 | 221.0204 | $1.84 \times 10^{-21}$ | 2.90112 |
| Interaction | 0.0198 | 9 | 0.0022 | 1.7959018 | 0.107867 | 2.186766 |
| Within | 0.0392 | 32 | 0.001225 | | | |
| Total | 009332 | 47 | | | | |

TABLE 9

ANOVA results depicting the main and interaction effects of different mass ratios of reactants on the mechanical compressive strength of the as-fabricated coco coir composite.

ANOVA results for mechanical compressive strength

| Source of variation | SS | df | MS | F | P-value | F crit |
|---|---|---|---|---|---|---|
| Mass ratio of PVA to reactive coco coir | 14.52955 | 3 | 4.843183 | 1405.519 | $4.94 \times 10^{-34}$ | 2.90112 |
| Mass ratio of bifunctional linkers to coco coir | 4.22295 | 3 | 1.40765 | 408.5079 | $1.41 \times 10^{-25}$ | 2.90112 |
| Interaction | 0.4157 | 9 | 0.046189 | 13.40427 | $1.43 \times 10^{-8}$ | 2.188766 |
| Within | 0.110267 | 32 | 0.003446 | | | |
| Total | 19.27847 | 47 | | | | |

Figure 21A:
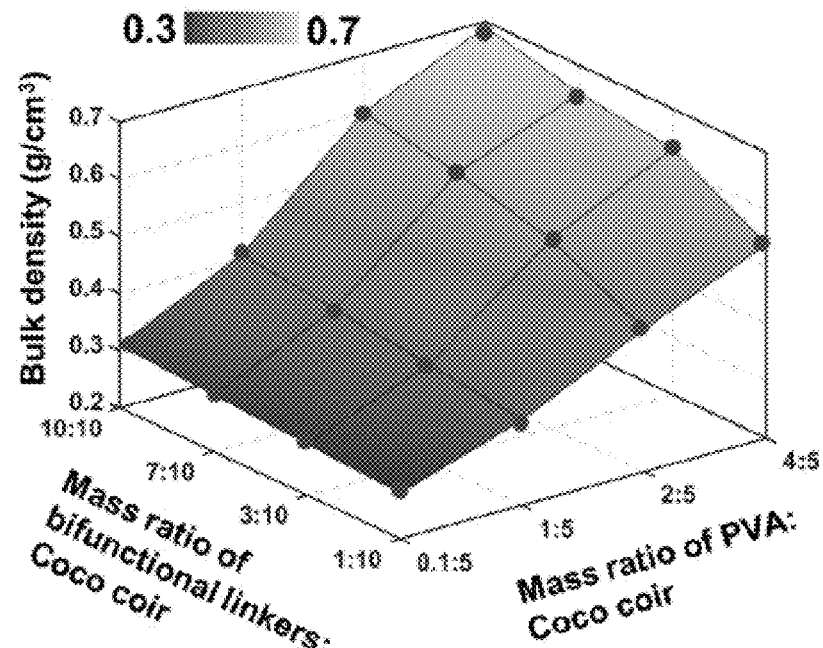
FIGS. 21A-21B. Surface plots showing the associative effects of different mass ratios of reactants to coco coir on bulk density (FIG. 21A) and mechanical compressive strength (FIG. 21B) of the coco coir composites.
Figure 21B:
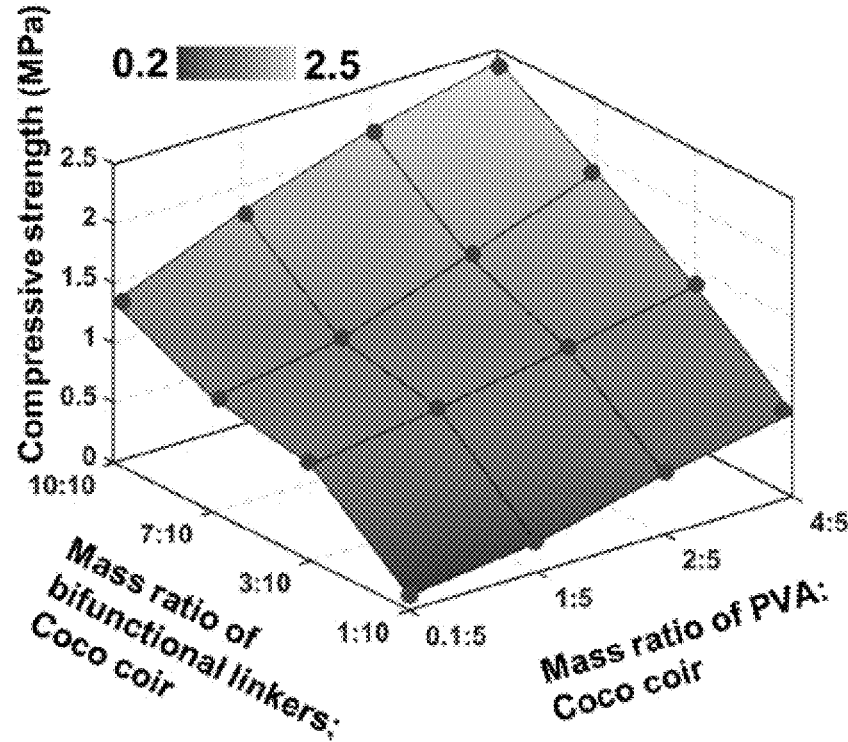

As depicted in the surface plots (FIG. 21), both bulk density and compressive strength of the as-fabricated coco coir composites followed a positive correlation with the mass ratio of the bifunctional linkers to coco coir along with the mass ratio of PVA to coco coir ratio. Among the studied sample space, the highest values of density, as well as compressive strength, were observed when both mass ratios of reactants to coco coir were greatest. Increasing the mass ratio of bifunctional linkers to coco coir enhanced the number of reactive sites on coco coir for crosslinking. By increasing the mass ratio of PVA to reactive coco coir, the reactive coco coir could access more hydroxyl groups on the PVA, resulting in higher crosslinking density, improved interfacial matrix bonding, and greater mechanical strength.

capability. A substrate's ability to retain moisture depends on its texture, porosity, bulk density, packing structure, and percentage of carbon content. Coco coir is hydrophilic, making them ideal for hydroponics. Interestingly, the water retention capacity of the coco coir composite made using a 3:10 mass ratio of the bifunctional linkers to coco coir along with a 2:5 mass ratio of PVA to reactive coco coir was measured to be 17.7%±2.3% (Table 10). The high-water retention capacity of the coco coir was credited to the use of PVA as a crosslinker because the OH groups present in PVA allow the coco coir composite to retain additional water. The water retention capacity of the peat moss (14.8%±2.7%) commonly used in hydroponics is comparable to that of the coco coir composite.

TABLE 10

Chemical and physical properties of commercial peat moss and the as-fabricated coco coir composite synthesized using a 3:10 mass ratio of the bifunctional linkers to coco coir and a 2:5 mass ratio of PVA to reactive coco coir.

| Material | Electrical conductivity $(mS \cdot cm^{-1})$ | pH | Carbon-to-nitrogen ratio | Bulk density $(g/cm^2)$ | Water retention capacity % | Compressive strength (MPa) |
|---|---|---|---|---|---|---|
| Coco coir composite | 1.42 | 7.6 | 32.1 | 0.37 | 17.8 ± 2.4 | 1.13 |
| Peat moss | 0.05 | 5.0 | 14.2 | 0.21 | 14.8 ± 2.7 | Not quantified |

Figure 22:
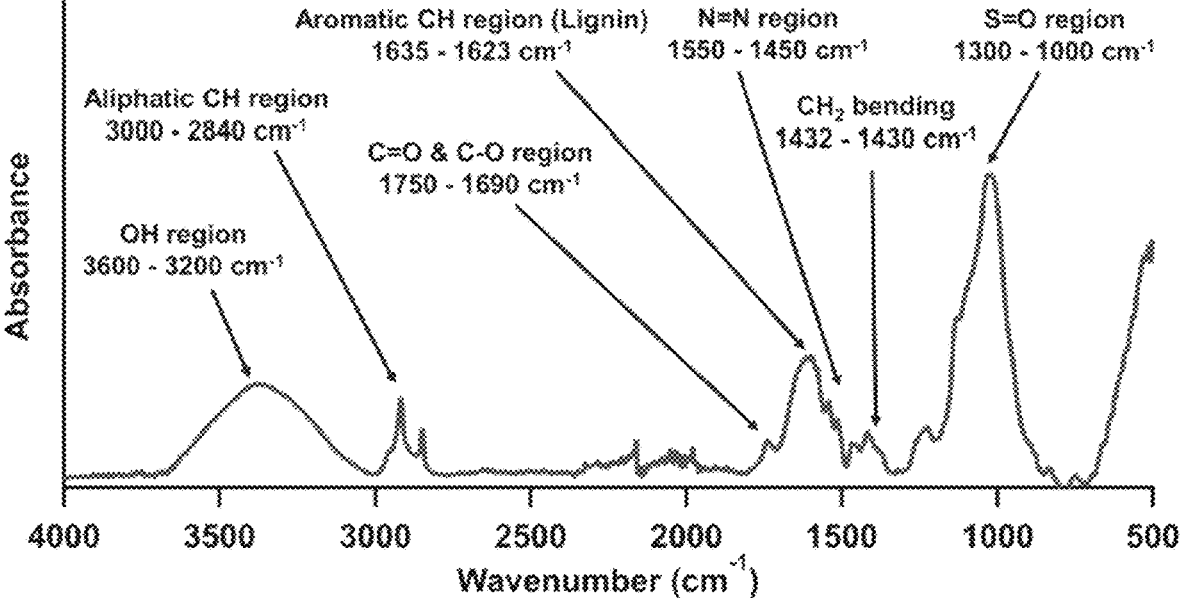
FIG. 22. ATR-FTIR spectrum of one representative coco coir composite sample fabricated using a 2:5 mass ratio of PVA to coco coir and a 3:10 mass ratio of the bifunctional linkers to coco coir.
Figure 25:
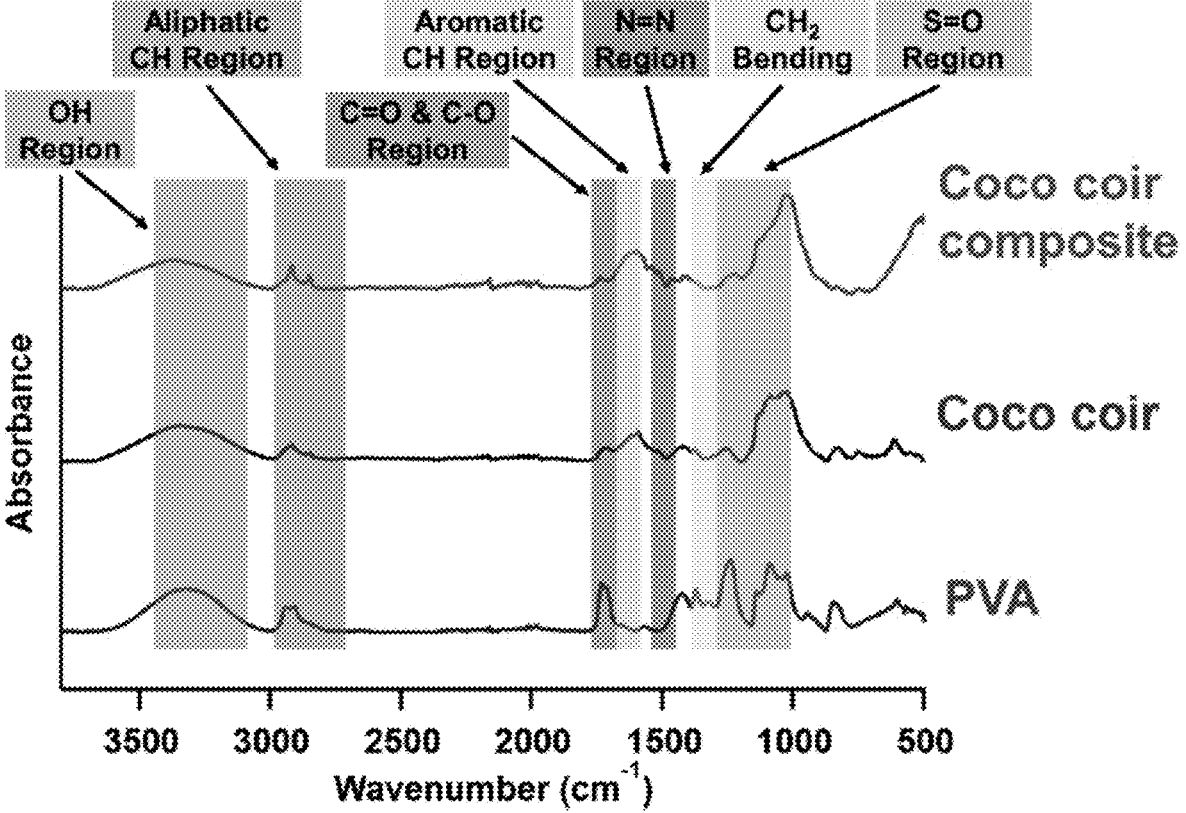
FIG. 25. ATR-FTIR spectra of (bottom) polyvinyl alcohol (PVA), (middle) coco coir, and (top) coco coir composite made using a 2:5 mass ratio of PVA to coco coir and a 3:10 mass ratio of the bifunctional linkers to coco coir. The 3500-3200 $cm^{-1}$ broad band was attributed to the OH stretch of PVA, whereas for both coco coir and its biocomposite, the OH stretch was characteristic of coco coir's hydrophilic nature indicating the presence of aromatic and aliphatic alcohols. The vibration band between 3000-2800 $cm^{-1}$ refers to the aliphatic C—H stretch due to the alkyl groups present in PVA, whereas for both coco coir and its biocomposite, the aliphatic C—H stretch was due to methyl and methylene groups present in cellulose and hemicellulose. The peaks between 1750-1690 $cm^{-1}$ are due to the C—O and C—O stretching from the ketols and acetyl groups present in PVA, whereas for both coco coir and its biocomposite, the C=O stretch was due to uronic ester and acetyl groups present in lignin. The vibration peaks in the region of 1635-1623 $cm^{-1}$ correspond to the aromatic C—H stretch arising from the phenylic rings of lignin within coco coir and its biocomposite. The vibration peak around the 1550-1450 $cm^{-1}$ region was evidence indicating the presence of the azo (N=N) bond formed when the bifunctional linkers were anchored onto the lignin forming the coco coir composite. The 1440-1420 $cm^{-1}$ vibration band corresponds to the CH2 bending present in PVA, coco coir, and its biocomposite. The 1300-1000 $cm^{-1}$ region was associated with the S=O group present within the bifunctional linkers in the coco coir composite, whereas for coco coir the 1086-1030 $cm^{-1}$ region denotes the deformation of C—O in primary and secondary alcohols.

ATR-FTIR spectroscopy was conducted to chemically characterize the different chemical functional groups present with the coco coir composites. The vibrational signature corresponding to functional groups within the bifunctional linkers and PVA could be detected in the FTIR spectra of the coco coir composites (FIG. 22). FIG. 22 showed distinct peak broadening in the 3600-3200 cm$^{-1}$ region, which is caused by the OH stretching within polyol groups. This broad peak signaled the presence of hydrogen-bonding networks originating from amorphous cellulose. The vibration band region from 3000 to 2840 cm-1, corresponding to the aliphatic C—H stretching mode, also denoted the presence of amorphous cellulose. The vibration peaks in the region of 1635-1623 cm$^{-1}$ corresponded to the conjugated C—H stretching mode arising from conjugated phenylic rings of lignin within coco coir. The 1750-1690 cm$^{-1}$ vibration region is due to the C=O & C—O stretching from ketols and acetyl group present in PVA. Additionally, C=O stretching due to the presence of uronic esters and acetyl groups present in the polymeric structure of lignin were observed in this region. In addition, an absorption band denoting the symmetric CH$_2$-bending mode was observed in the 1432-1430 cm$^{-1}$ region. The vibration peak around the 1550-1450 cm$^{-1}$ region was evidence indicating the presence of the azo (N=N) bond formed when the bifunctional linkers were anchored onto the lignin. Furthermore, the sulfone (S=O) functional group present within the bifunctional linkers were denoted by the vibration band in the 1300-1000 cm$^{-1}$ region. This FTIR spectrum also compared with those of the coco coir and the PVA (FIG. 25). Though the differences between the FTIR spectra of the coco coir composite and the coco coir were small, there were significantly dissimilar features that indicated the presence of the azo bonds and the sulfone functional groups in the coco coir composites.

Porosity and water retention capacity are important properties for growth media materials intended for hydroponics. The water retention capacity of a substrate is a physical characteristic indicative of its air porosity and water holding The carbon-to-nitrogen ratio (C/N) of a growth medium indirectly infers essential information of the amount and/or the type of nitrogen available to the plants and microbes present within a substrate and, thus, its suitability as a versatile hydroponic growth media. For example, a decline in the C/N ratio of a growth medium is a clear indicator of fermentation when its nitrogen content gets consumed by microbes, while the carbon content functions as the primary energy source for the microorganisms. At C/N>30, microbes usually do not thrive well within a growth media because the degradation rate of compost decreases drastically. On the contrary, if C/N<25, the nitrogen within the growth media would be transformed into the ammonium ions by the microbes for their consumption and growth. The C/N value of the coco coir biocomposite sample synthesized with a 3:10 mass ratio of the bifunctional linkers to coco coir along with a 2:5 mass ratio of PVA to reactive coco coir was measured to be 32.1 (Table 10), which is within the acceptable range for a suitable hydroponic growth substrate.

The electrical conductivity (EC) and acidity (pH) of a hydroponic growth substrate significantly influence the transfer and availability of essential minerals and nutrients to the plant. The estimation of pH can also be useful in controlling certain deficiencies in minerals and nutrients and toxicities of heavy metals towards selective plant species. Optimal pH ranges for hydroponics are dependent on the type of plant. The majority of preferred plant growth pH is between 6 and 7. The EC measurement infers the amount or type of ionic compounds present within the hydroponic growth substrate as well as the capacity of the hydroponic growth substrate to conduct ionic species and uptake minerals. The pH for the coco coir composite was found to be marginally basic (pH=7.6) (Table 10). The residual NaOH in the fabrication process likely caused this slight pH increase. In general, based on a particular pH requirement for a certain plant species to grow, the pH of the growth substrate can be regulated. For example, phosphoric acid or acetic acid can be added if the medium is too basic. Additionally, if a plant requires a pH large than 7 to grow, then the pH can be raised by the addition of sodium bicarbonate ($NaHCO_3$) or diluted potassium hydroxide (KOH). The electrical conductivity (EC) of the coco coir biocomposite sample synthesized using a 3:10 mass ratio of the bifunctional linkers to coco coir along with a 2:5 mass ratio of PVA to reactive coco coir was determined to be 1.4 mS $cm^{-1}$ (Table 10). This value fell within the appropriate range for a suitable hydroponic growth medium (<2.0 mS cm-1).

Figure 23:
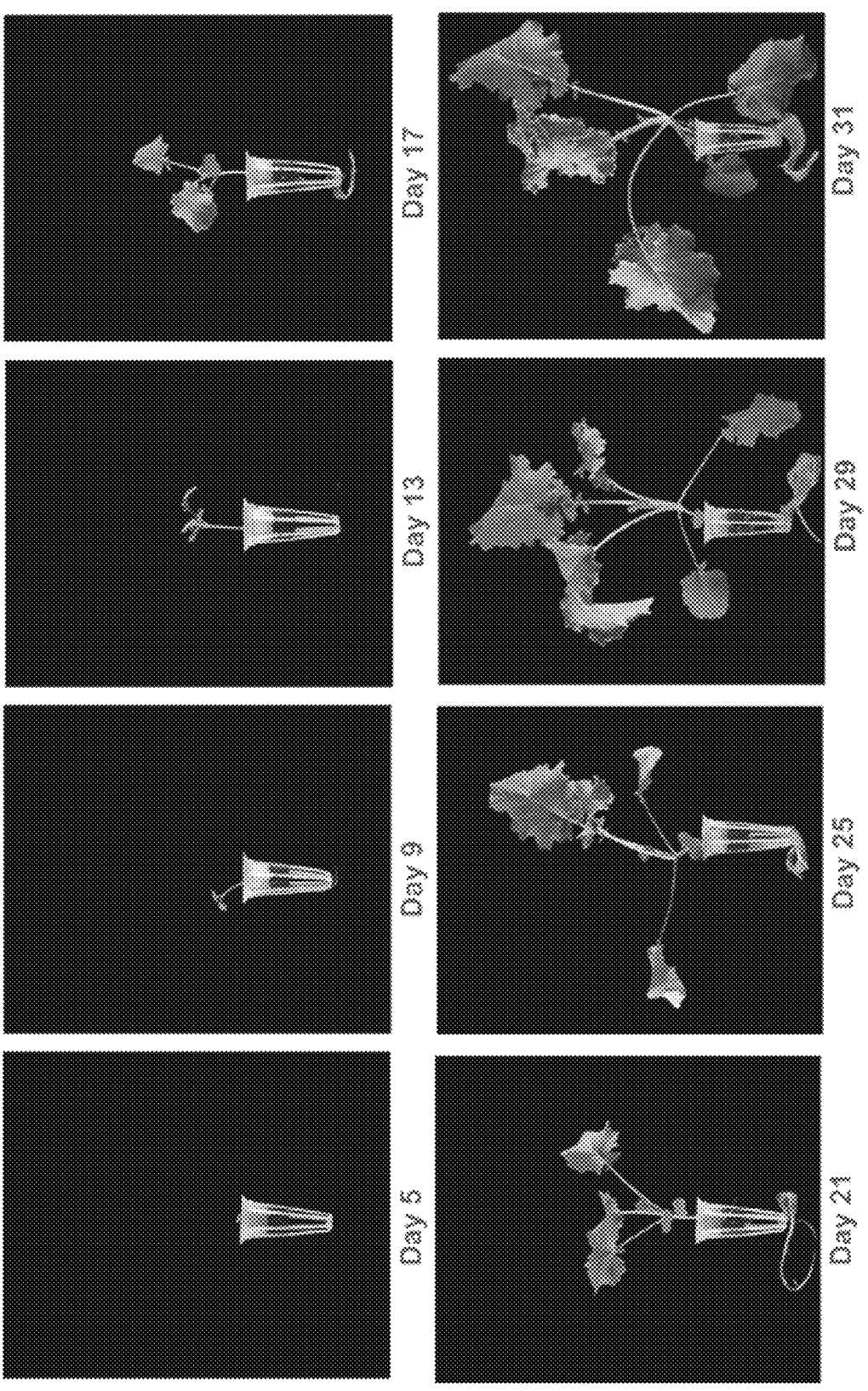
FIG. 23. Photos depicting the growth of a kale plant with a coco coir biocomposite as the hydroponic growth medium from Day-5 to Day-31.
Figure 26:
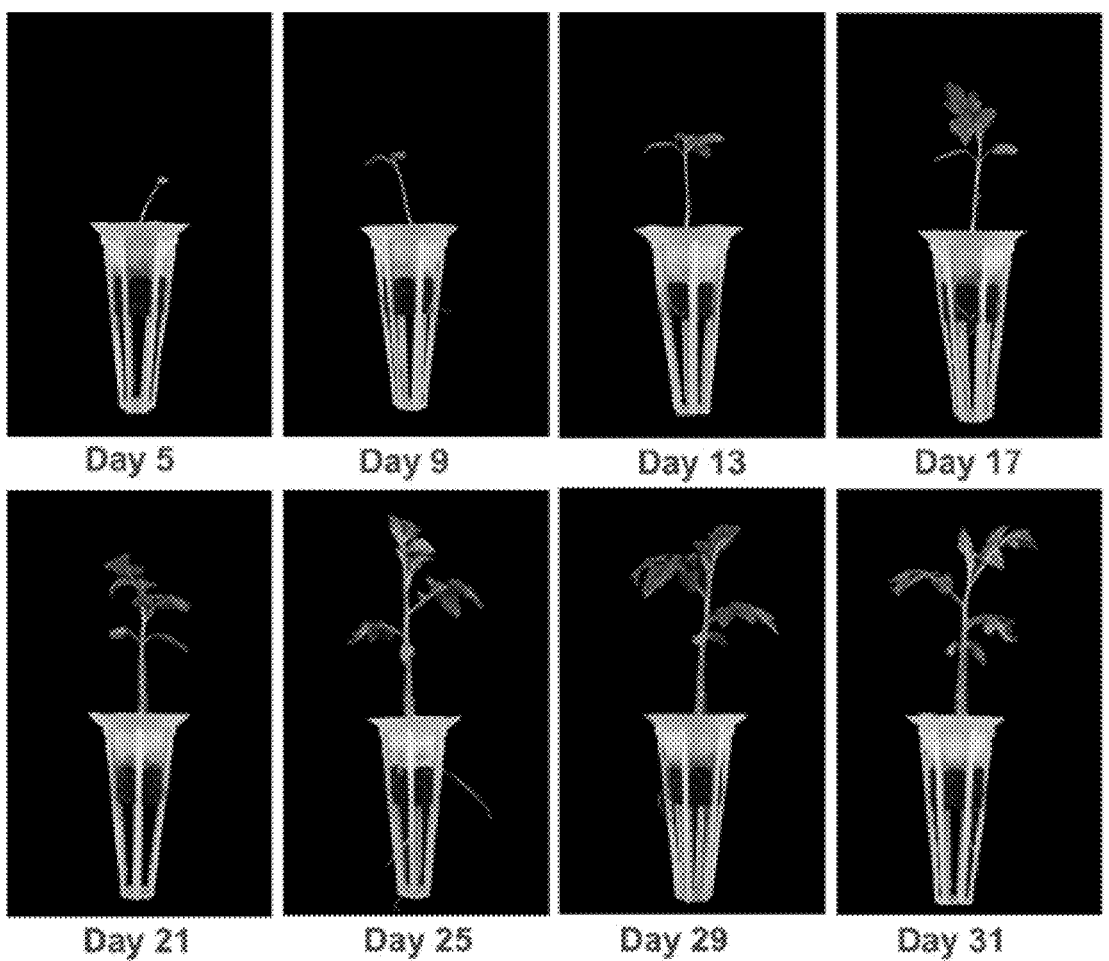
FIG. 26. Photos showing the hydroponic growth of a cherry tomato (Solanum lycopersicum) plant using a coco coir composite growth medium from Day-5 to Day-31.
Figure 27:
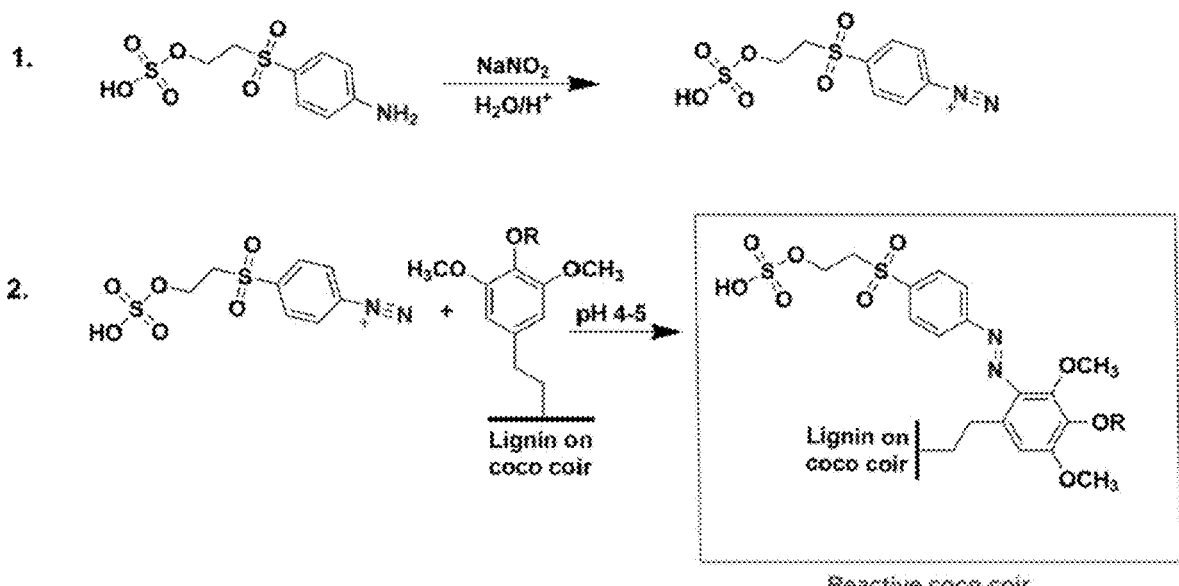
FIG. 27. Scheme 4. Reaction scheme depicting the activation of lignin within coco coir. Step 1 comprises the diazotization of the aromatic amine group present within the bifunctional linkers. In Step 2, the modified bifunctional linkers are anchored to lignin to form reactive coco coir.
Figure 28:
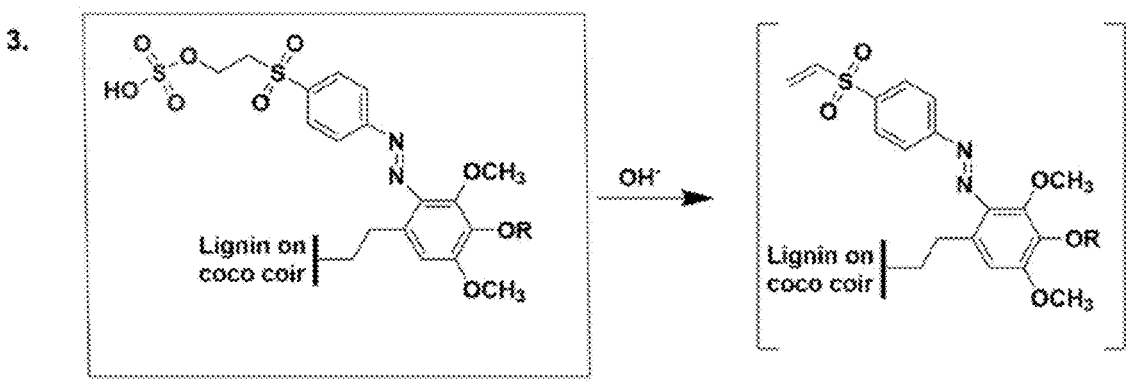
FIG. 28. Scheme 5. Reaction scheme depicting the crosslinking reaction between polyvinyl alcohol (PVA) and reactive coco coir. The reaction intermediate is denoted with square brackets.
Figure 29:
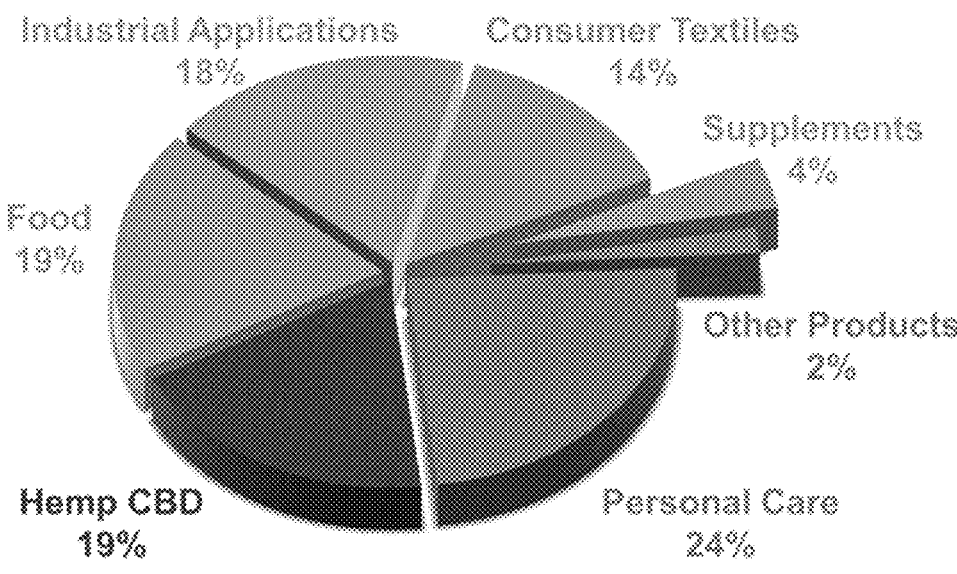
FIG. 29. Schematic showing sales of hemp-based products in different commercial segments in the U.S. market.
Figure 30:
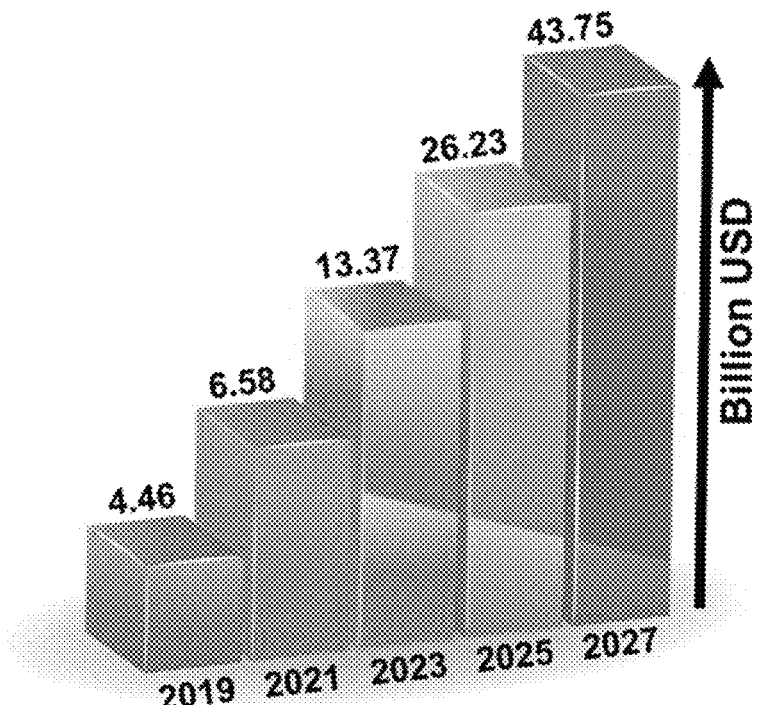
FIG. 30. Forecasted worldwide hemp fiber market reported by the Food and Agriculture Organization of the United Nations (FAO).

In the 31-day plant growth studies, the versatility and compatibility of the coco coir composites as eco-friendly hydroponic growth media for kale and cherry tomato plants was demonstrated. Typically, the optimal pH range is close-to-neutral (6.5-7.5) for kale, whereas the optimal pH range is slightly acidic (5.5-6.5) for cherry tomatoes. In the experiments, the seeds of cherry tomatoes and kale were individually placed into the drilled holes of the coco coir composites synthesized with a 3:10 mass ratio of the bifunctional linkers to coco coir along with a 2:5 mass ratio of PVA to reactive coco coir. The seeded biocomposites were inserted into plastic growth baskets and carefully placed within the "Farm 12" hydroponic growth system. The seed germination and plant growth were visually observed, and their photographs were taken for 31 days (FIG. 23 and FIG. 26).

The plant growth rate was examined by evaluating the height of these plants from the top of the biocomposites and recording the total number of leaves. Tables 11 and 12 list the plant growth parameters for the kale and cherry tomato plants, respectively. For both kale and cherry tomato plants, their seeds germinated by Day-5 of the growth period (FIG. 23 and FIG. 26). The kale plant was observed to grow significantly starting from Day-7. Its true leaves started to appear on Day 13. After 15 growth days, its roots were visibly differentiable to the naked eye and the plant height increased from 1.8 cm on Day-5 to 23 cm on Day-31. By the end of the 31-day growth period, the kale plant had a total of 14 leaves.

TABLE 11

List of plant growth parameters for assessing the growth of a kale plant using the coco coir composite in the hydroponic system.

| Growth day | Number of leaves | Height of plant (cm) |
| --- | --- | --- |
| Day-5 | 2 | 1.8 |
| Day-9 | 3 | 3.8 |
| Day-13 | 4 | 5.2 |
| Day-1 | 5 | 10.1 |
| Day-2 | 6 | 13.7 |
| Day-25 | 10 | 20.4 |
| Day-29 | 12 | 22.7 |
| Day-31 | 14 | 23.4 |

TABLE 12

Growth parameters employed to evaluate the hydroponic growth of a cherry tomato (Solanum lycopersicum) plant with a coco coir composite as the growth medium.

| Growth day | Number of leaves | Height of plant (cm) |
| --- | --- | --- |
| Day-5 | 2 | 3.3 |
| Day- 9 | 3 | 5.4 |
| Day-13 | 4 | 6.2 |
| Day-17 | 7 | 8.1 |
| Day-21 | 9 | 8.9 |

TABLE 12-continued

Growth parameters employed to evaluate the hydroponic growth of a cherry tomato (Solanum lycopersicum) plant with a coco coir composite as the growth medium.

| Growth day | Number of leaves | Height of plant (cm) |
| --- | --- | --- |
| Day-25 | 11 | 9.8 |
| Day-29 | 13 | 10 6 |
| Day-31 | 16 | 11.0 |

In comparison, the observed growth rate of the cherry tomato plant was slower than that of the kale plant as evident by the data describing the plant height data and the root system. On Day-31 of the growth period, the height of the cherry tomato plant was 11 cm (Table 12) and was much shorter than that of the kale plant (23 cm). The root system of the cherry tomato plant, though developed, was not as extensive as that of the kale plant (FIG. 26). However, the total number of leaves of the cherry tomato plant was 16, which was similar to that of the kale plant. Nevertheless, the differences were likely to the genetics of the plants because the overall growth rate and parameters of the cherry tomato plant were comparable to previous studies of cherry tomato growth under hydroponic conditions. Even though both the plants had different optimal pH requirements to grow, they grew well using the coco coir composites as the hydroponic growth medium without any pH adjustment.

Together, these results demonstrate that a water-based chemical approach using diazonium chemistry (or azo coupling) can be used to make durable, solid material hemp fiber composites. These results also demonstrate that such hemp fiber composites can be used as plant growth media for hydroponics.

Example 4: Upcycling Hemp Fibers into Biocomposite Materials Via a One-Step Pectin-Based Green Fabrication Process This Example describes an eco-friendly fabrication approach to valorize hemp fibers into multi-functional bio-composite materials using a pectin-based chemical pathway. For example, hemp fibers were cross-linked by reacting with pectin under basic conditions to produce fiber biocomposites. The water-based chemical methodology described herein, and the use of pectin as the cross-linker, allow the fabrication of hemp fiber biocomposites in a one-pot process.

Figure 31:
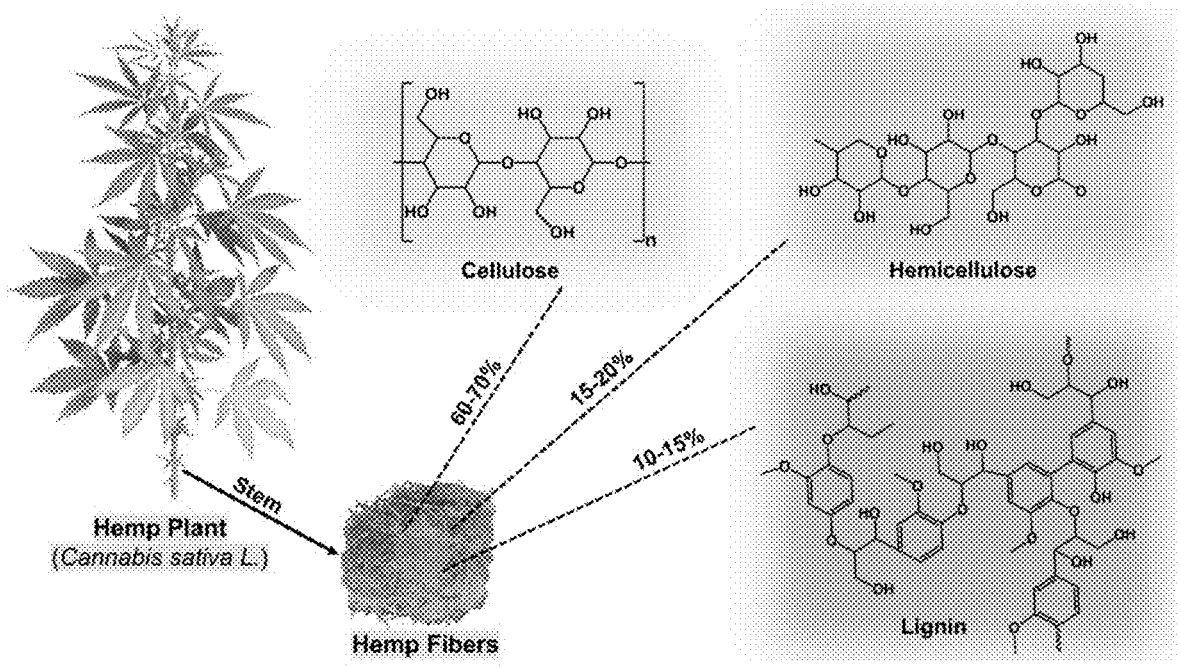
FIG. 31. Schematic showing different components of hemp fiber from the stem of a hemp plant.
Figure 32:
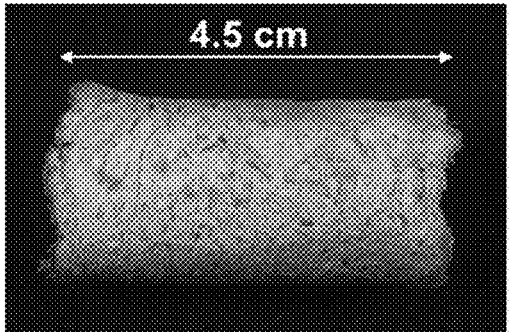
FIG. 32. Photograph of a hemp fiber biocomposite synthesized with a 2:5 mass ratio of pectin to hemp fiber.

Lignin is a biopolymer with a three-dimensional molecular structure that consists of methoxylated aromatic structures with hydroxyl functional groups. It embeds hemicellulose-coated cellulose fibers and increases the rigidity and the mechanical strength of the hemp fiber (FIG. 31).

Materials and Methods

Materials

Hemp fibers were bought from Hemp Traders (Paramount, CA). Pectin citrus (MW 110,000-150,000 g/mol, galacturonic acid ≥74%, degree of esterification 70-75%) was obtained from Fisher Scientific (Waltham, MA). Sodium hydroxide pellets (NaOH) and concentrated hydrochloric acid (HCl) were obtained from VWR International (Radnor, PA). All chemicals were used as purchased. Nanopure water of 18.2 MΩ·cm resistivity was sourced from a Synergy water purification system (VWR, Radnor, PA).

Synthesis of Hemp Fiber Biocomposites

The one-step fabrication process of hemp fiber biocomposites was carried out using different mass ratios of pectin to hemp fiber (1:5, 2:5, 3:5, 4:5, and 5:5) (Scheme 6 and Scheme 7). For example, to fabricate a hemp fiber biocomposite with a 2:5 mass ratio of pectin to hemp fiber, 4 g of hemp fiber was mixed with 16 g of a 10 wt. % pectin aqueous solution. The mixture was stirred using a glass rod until a uniform slurry was obtained. 1 M NaOH aqueous solution was then slowly added to the paste until a pH of 14 is achieved. This paste was then packed in a 4-inch-long quartz tube mold with a 1-inch diameter and compressed manually using a cylindrical wooden stick. During this process, most of the excess water and air present in the paste were removed. The filled tube was heated to 60-80° C. to create a cross-linked network of hemp fiber powder for 2 hours. The as-formed cylindrical plug products were removed from the quartz tube and then dried at 100° C. overnight.

Effect of pH Levels on Mechanical Compressive Strength

To highlight the applicability and versatility of the fabrication process, additional hemp fiber biocomposites were made at different pH. Hence, the fabrication of hemp fiber biocomposite with a 2:5 mass ratio of pectin to hemp fiber was carried out at six different pH conditions (1, 2, 7, 12, 13, and 14).

Characterization of Hemp Fiber Composites

Characterization of chemical composition. ATR-FTIR spectroscopy was applied to study different chemical functional groups present within pectin, unreacted hemp fiber, and as-fabricated hemp fiber biocomposite samples with a Thermo Nicolet Avatar 380 FTIR (Thermo Fisher Scientific, Madison, WI).

Mechanical compression study and bulk density measurement. The hemp fiber biocomposite sample's bulk density was numerically evaluated by dividing the mass of each hemp fiber biocomposite sample by its volume computed using its measured physical dimensions. The Instron 5966 Test System (Instron Corporation, Norwood, MA) was applied to measure the mechanical compressive strength of the hemp fiber composite samples. First, the hemp fiber composite samples were mechanically milled to yield flat-ended cylindrical-shaped hemp fiber composite samples. These samples varied in length ranging from 34 mm to 45 mm. These milled hemp fiber composite cylindrical samples had diameters of around 20-21 mm. All mechanical compression studies for the hemp fiber composites were performed with a compression rate of 2 mm/minute for about 10 minutes to measure their load-bearing capabilities. The compressive strength was obtained from the measured computing load-time curves and evaluated by dividing the highest load by the cross-sectional area of the cylindrical hemp fiber composite sample. The mean values of the mechanical compressive strengths of the hemp fiber composite samples were obtained by studying three specimens for each described fabrication method.

Data Analysis Using One-Way Analysis of Variance (ANOVA)

The relative amounts of pectin and hemp fibers used in the fabrication of hemp fiber biocomposites can significantly influence the degree of crosslinking within the biocomposites and hence their resulting physical and chemical properties. A one-factor analysis of variance (ANOVA) study was conducted to evaluate the influence of the mass ratio of pectin to hemp fiber used in the fabrication on the bulk density and the mechanical compressive strength of the resulting biocomposites. In this analysis, mass ratios of reactants constituted the input variables whereas the bulk density and the mechanical compressive strength of the hemp fiber composites were the response variables. The ANOVA was performed with a significance level (a) of 0.05 (95% confidence interval) by using the built-in data analysis function in Microsoft Excel. Six different batches of hemp fiber biocomposites with six different mass ratios of pectin to hemp fiber (1:5, 2:5, 3:5, 4:5, and 5:5). The mass of pectin was varied by adding corresponding different masses of a 10 wt. % pectin solution to hemp fiber. Triplicates of these samples were produced to determine the statistical variations of their properties. Note that the bulk density of these biocomposites was found to significantly depend on the relative amounts of pectin used in the reactions. This factor could change the bulk density of the as-fabricated samples by up to four times in our one-factor study. Thus, the total amounts of reactants were proportionally scaled up to provide sufficient materials for producing the cylindrical biocomposite samples, which are ca. 20-21 mm in diameter and 35-45 mm in length. The bulk density and the compressive strength of the fabricated samples were measured using the procedures described in Section 2.4 to elucidate the relationships of these properties to the ratios of reactants.

Results

Figure 35:
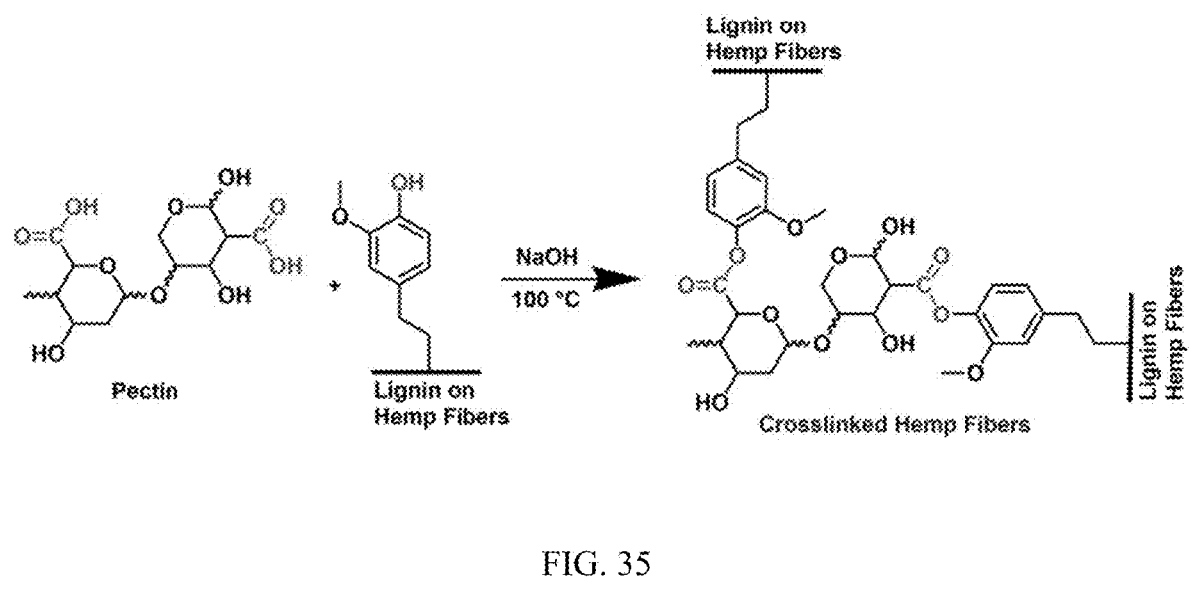

Through the water-based fabrication process, the as-fabricated hemp fiber biocomposites were typically dark brown and firm. Their lengths were between 3 cm and 5 cm and their diameters were ca. 2 cm (FIG. 33). The color of the hemp fiber composites almost stayed constant as the mass ratio of pectin to hemp fiber increased (FIG. 35). The as-fabricated composites were more uniform in color and firmness by visual inspection.

Figure 33A:
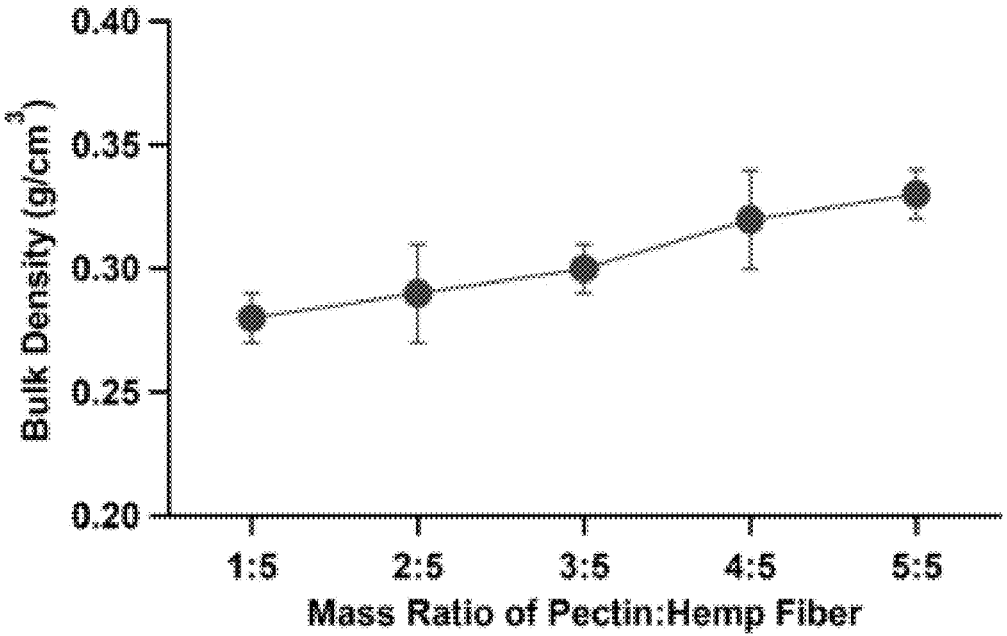
FIGS. 33A-33B. Marginal mean plots of bulk density (FIG. 33A) and mechanical compressive strength (FIG. 33B) of the hemp fiber biocomposites with input variable (mass ratios of pectin to hemp fiber).

The one-factor study illustrated the effects of the mass ratios of pectin to hemp fiber used in the fabrication process on the bulk density of the fabricated hemp fiber biocomposites (FIG. 33A and Table 13). The one-factor ANOVA revealed that there was a statistically significant interaction between the effects of the mass ratio of pectin to hemp fiber on the bulk density of hemp fiber composites ($F_{(4, 10)}=5.86336$, $p=0.010751$) (Table 14). For example, as the mass ratio of the pectin to hemp fiber increased from 1:5 to 5:5, the bulk density of the hemp fiber biocomposites showed up to a ca. 1.1-fold increment (FIG. 33A and Table 14). This trend and the range of bulk density values (0.28-0.33 g/cm$^3$) indicated that the hemp fiber biocomposites could be packed denser by increasing the relative amount of pectin in the fabrication process.

TABLE 13

Bulk density of hemp fiber composites fabricated using different mass ratios of pectin to hemp fiber.

| Mass ratio of pectin to hemp fiber | Bulk density (g/cm$^3$) |
|---|---|
| 1:5 | 0.28 ± 0.01 |
| 2:5 | 0.29 ± 0.02 |
| 3:5 | 0.30 ± 0.01 |
| 4:5 | 0.32 ± 0.02 |
| 5:5 | 0.33 ± 0.01 |

TABLE 14

ANOVA (one-factor) results depicting the main and interaction effects of different
mass ratios pectin to hemp fiber on the bulk density of the as-fabricated hemp fiber composite.
ANOVA results for bulk density

| Source of variation | SS | df | MS | F | P-value | F crit |
|---|---|---|---|---|---|---|
| Interaction between mass ratios | 0.00516 | 4 | 0.00129 | 5.86336 | 0.010751 | 3.47805 |
| Within between mass ratios | 0.0022 | 10 | 0.00022 | | | |
| Total | 0.00736 | 14 | | | | |

Figure 33B:
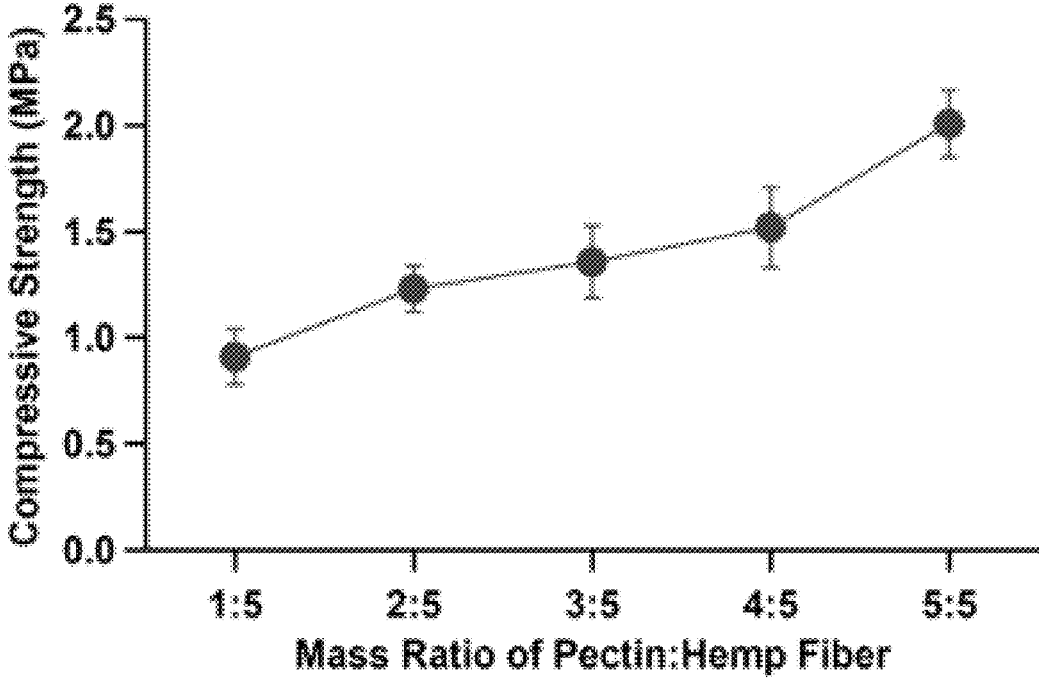

Similarly, the one-way study also showed the effect of the mass ratios of pectin to hemp fiber used in the fabrication process on the mechanical compressive strength of the fabricated hemp fiber composites (FIG. 33B and Table 15). The one-way ANOVA revealed that there was a statistically significant interaction between the mass ratio of pectin to hemp fiber on the bulk density of hemp fiber biocomposites ($F (4, 10)=22.19022$, $p<0.001$) (Table 16). For instance, as the mass ratio of pectin to hemp fiber increased from 1:5 to 5:5, the compressive strength of the hemp fiber composites showed up to a ca. 2.2-fold increment (FIG. 33B and Table 15). This confirmed that the concentration of pectin could improve the degree of crosslinking and thus interfacial matrix bonding between hemp fiber in our sample space. The effect of an increase in the concentration of hemp fiber on the compressive strength was observed to be more significant. Without being bound by theory, this was thought to be because the hemp fiber provided more reactive sites per unit weight to increase the degree of crosslinking between the hemp fibers.

Figure 34:
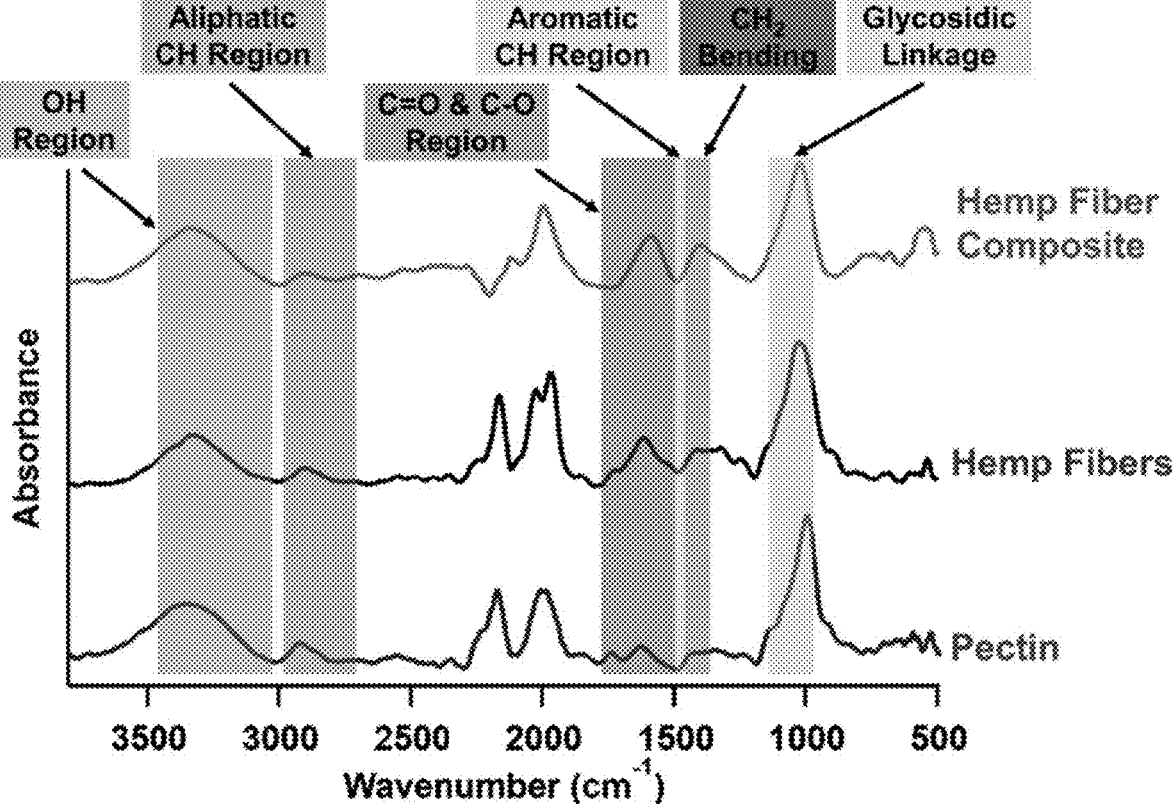
FIG. 34. ATR-FTIR spectrum of a representative hemp fiber biocomposite sample fabricated using a 2:5 mass ratio of pectin to hemp fiber.
Figure 37:
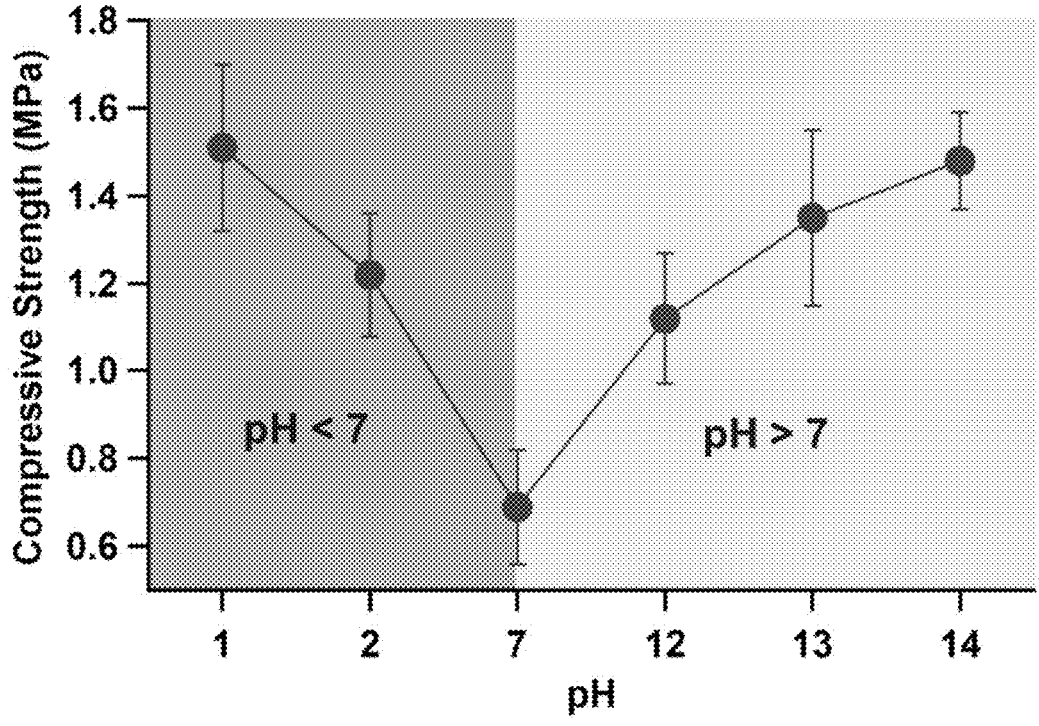
FIG. 37. Plot depicting the trend in the mechanical strength of the hemp fiber biocomposite at different pH values.

ATR-FTIR spectroscopy was conducted to chemically characterize the different chemical functional groups present with the hemp fiber biocomposites. The vibrational signature corresponding to functional groups within pectin could be detected in the FTIR spectra of the hemp fiber biocomposites (FIG. 34). FIG. 34 showed distinct peak broadening in the 3,600-3,200 $cm^{-1}$ region, which is caused by the intramolecular H-bonding and the —OH stretching within pectin, cellulose, and lignin. This broad peak signaled the presence of H-bonding networks originating from amorphous cellulose present in hemp fibers. The vibration band region from 3,000-2,840 $cm^{-1}$ corresponds to the aliphatic C—H stretching mode present in pectin as well as in amorphous cellulose. The 1,750-1,690 cm-1 vibration region is due to the C═O & C—O stretching from the ester groups formed by the crosslinking reaction between the carboxyl groups of pectin and the hydroxyl groups of lignin, as well as to the unreacted carboxylic acids of pectin. Additionally, C—O stretching due to the presence of uronic esters and acetyl groups present in the polymeric structure of lignin were observed in this region. The vibration peaks in the region of 1,635-1,623 cm-1 corresponded to the conjugated C—H stretching mode arising from conjugated phenylic rings of lignin within hemp fiber. In addition, an absorption band denoting the symmetric $CH_2$-bending mode was observed in the 1,432-1,430 $cm^{-1}$ region 11. The 1,200-950 $cm^{-1}$ range is considered as the 'fingerprint' region for carbohydrates such as pectin as it allows the identification of major chemical groups in polysaccharides. The peaks at 1145 $cm^{-1}$ and 1100 $cm^{-1}$ signifies the glycosidic linkage (C—O—C) and the C—C bonding present in pectin.64 Note that though the differences between the FTIR spectra of the hemp fiber biocomposite and pectin were small due to the ester bonds and carboxylic acid functional groups present within the hemp fiber composites and pectin. This was expected because the dominant IR signals were from the hemp fiber which was the major component of the composite in this sample.

TABLE 15

Compressive strength of coco coir composites
fabricated using different mass ratios of
pectin to hemp fibers.

| Mass ratio of pectin to hemp fiber | Compressive strength (MPa) |
|---|---|
| 1:5 | 0.91 ± 0.13 |
| 2:5 | 1.48 ± 0.11 |
| 3:5 | 1.66 ± 0.17 |
| 4:5 | 1.82 ± 0.19 |
| 5:5 | 2.01 ± 0.16 |

TABLE 16

ANOVA results depicting the main and interaction effects of different mass ratios
of reactants on the mechanical compressive strength of the as-fabricated hemp fiber composite.
ANOVA results for mechanical compressive strength

| Source of variation | SS | df | MS | F | P-value | F crit |
|---|---|---|---|---|---|---|
| Interaction between mass ratios | 2.12316 | 4 | 0.53079 | 22.19022 | $5.85 \times 10^{-5}$ | 3.47805 |
| Within between mass ratios | 0.2392 | 10 | 0.02392 | | | |
| Total | 2.36236 | 14 | | | | |

TABLE 17

| Compressive strength of coco coir composites fabricated using 2:5 mass ratio of pectin to hemp fibers and different pH levels. | | |
| --- | --- | --- |
| Reaction Condition | pH Level | Compressive Strength (MPa) |
| Acidic | 1 | 1.51 ± 0.28 |
| | 2 | 1.22 ± 0.03 |
| Neutral | 7 | 0.69 ± 0.13 |
| Basic | 12 | 1.12 ± 0.15 |
| | 13 | 1.35 ± 0.39 |
| | 14 | 1.48 ± 0.11 |

Together, these results demonstrate that a water-based chemical approach using a one-step pectin-based fabrication process can be used to make durable, solid material hemp fiber composites. These results also demonstrate that such hemp fiber composites can be used as plant growth media for hydroponics.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A water-based method for making a plant fiber biocomposite comprising a network of lignin-containing plant fibers crosslinked by a polymer, said method comprising contacting said lignin-containing plant fiber with the polymer in water at a pH of from about 0 to about 5 to crosslink said lignin-containing plant fiber to said polymer.

2. The method of claim 1, wherein said lignin-containing plant fiber is selected from the group consisting of a hemp fiber, a flax fiber, a jute fiber, a sisal fiber, a kenaf fiber, a coconut husk fiber, and a coco coir fiber.

3. The method of claim 1, wherein said contacting comprises a temperature of from about 60° C. to about 100° C.

4. The method of claim 1, wherein said method is performed without producing formaldehyde, methylene chloride, or methanol.

5. The method of claim 1, wherein the polymer comprises pectin or polyvinyl alcohol (PVA).

* * * * *